(12) United States Patent
Schlanger

(10) Patent No.: US 6,374,975 B1
(45) Date of Patent: Apr. 23, 2002

(54) MOVABLE TORQUE COUPLING ELEMENT FOR THE TRANSMISSION OF TORQUE BETWEEN TWO COLINEAR SHAFTS

(76) Inventor: Raphael Schlanger, 128 Hulda Hill Rd., Wilton, CT (US) 06897

( * ) Notice: Subject to any disclaimer, the term of this patent is extended or adjusted under 35 U.S.C. 154(b) by 0 days.

(21) Appl. No.: 09/497,469

(22) Filed: Feb. 3, 2000

Related U.S. Application Data

(60) Provisional application No. 60/121,546, filed on Feb. 25, 1999.

(51) Int. Cl.⁷ .............................................. F16D 23/00
(52) U.S. Cl. ........................................ 192/64; 192/46
(58) Field of Search ...................... 192/64, 46, 41 R; 301/105.1

(56) References Cited

U.S. PATENT DOCUMENTS

| | | | |
|---|---|---|---|
| 4,103,914 A | * 8/1978 | Rohm | 279/4 |
| 4,567,973 A | 2/1986 | Butz | |
| 5,324,100 A | * 6/1994 | James | 192/64 X |
| 5,433,306 A | * 7/1995 | Yang | 192/64 |
| 5,676,227 A | * 10/1997 | Hugi | 192/64 |
| 5,678,454 A | * 10/1997 | Cartwright et al. | 74/493 |
| 5,738,197 A | * 4/1998 | Kroger et al. | 192/64 |
| 5,996,454 A | * 12/1999 | Binks, Jr. | 82/151 |
| 6,068,349 A | * 5/2000 | Henderson et al. | 301/110.5 X |
| 6,240,995 B1 | * 6/2001 | Corghi | 157/1.22 |

FOREIGN PATENT DOCUMENTS

| | | |
|---|---|---|
| FR | 2501124 | 9/1982 |
| FR | 2518461 | 6/1983 |
| IT | 488131 | 12/1953 |

* cited by examiner

Primary Examiner—David A. Bucci
Assistant Examiner—Saúl Rodriguez
(74) Attorney, Agent, or Firm—Bachman & LaPointe, P.C.

(57) ABSTRACT

The present invention relates to the attachment of a rear bicycle wheel to the bicycle frame and involves a decoupling engagement mechanism between the one-way clutch assembly of the freehub, commonly referred to as the freehub body, and the rear hub shell.

57 Claims, 16 Drawing Sheets

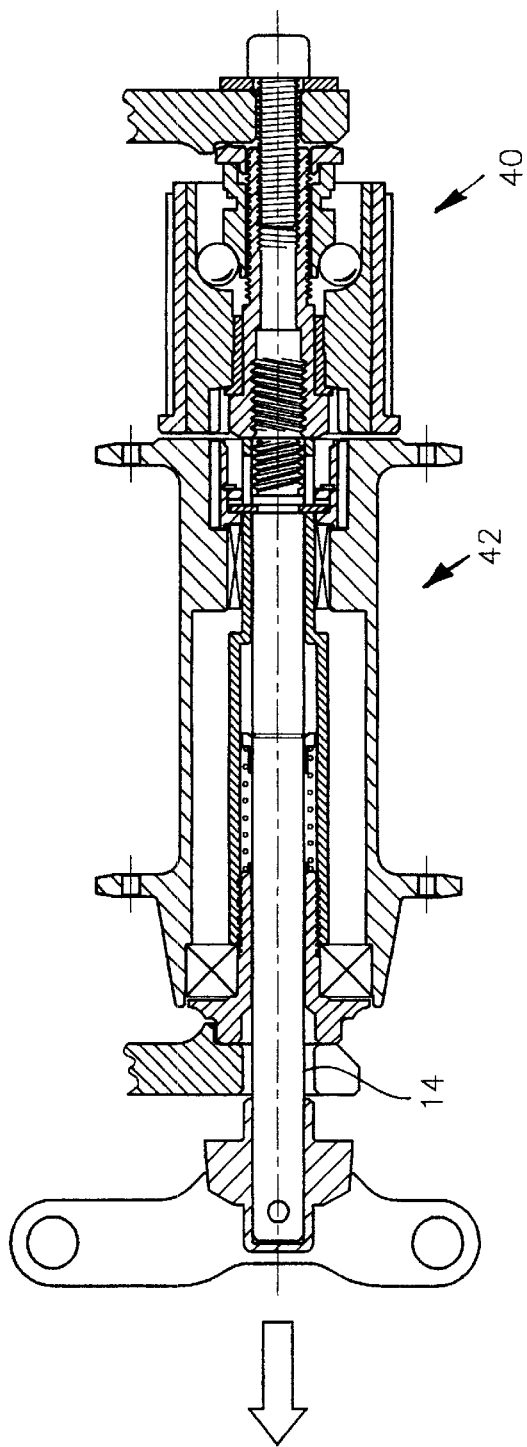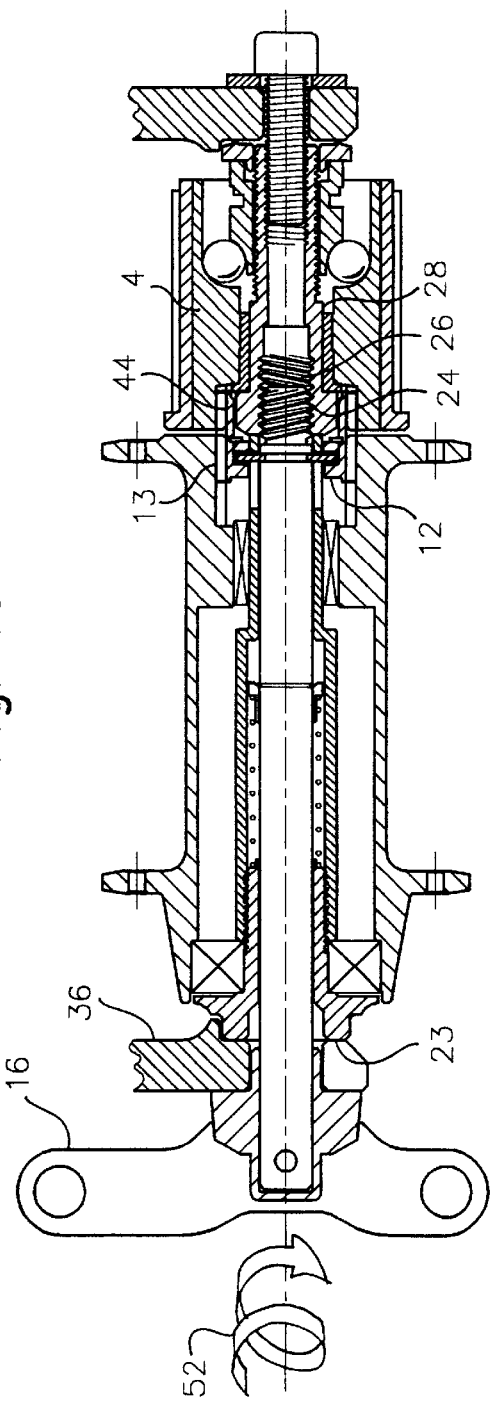
Fig. 1c
Fig. 1d

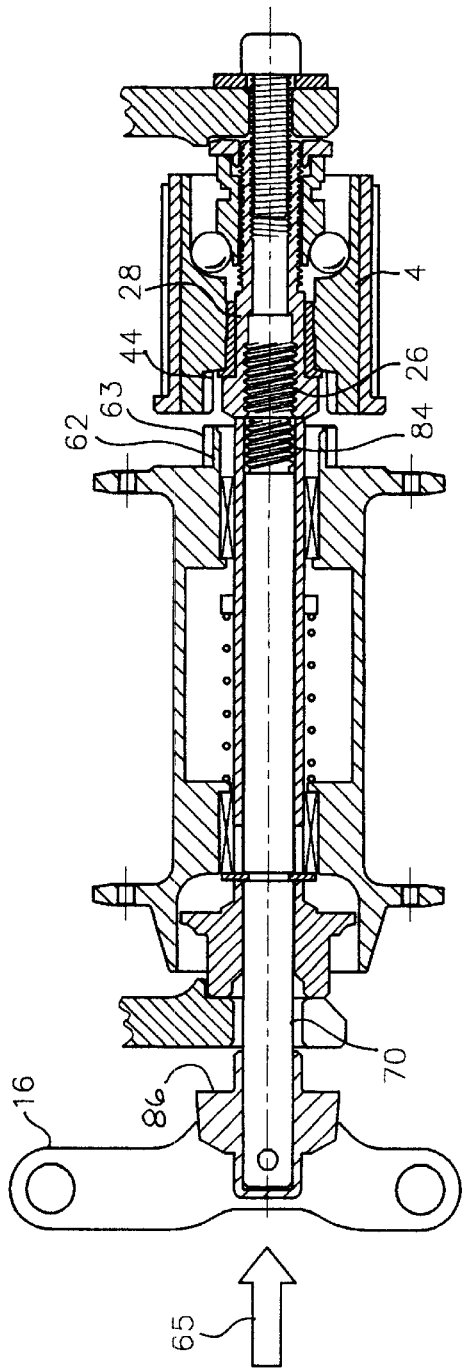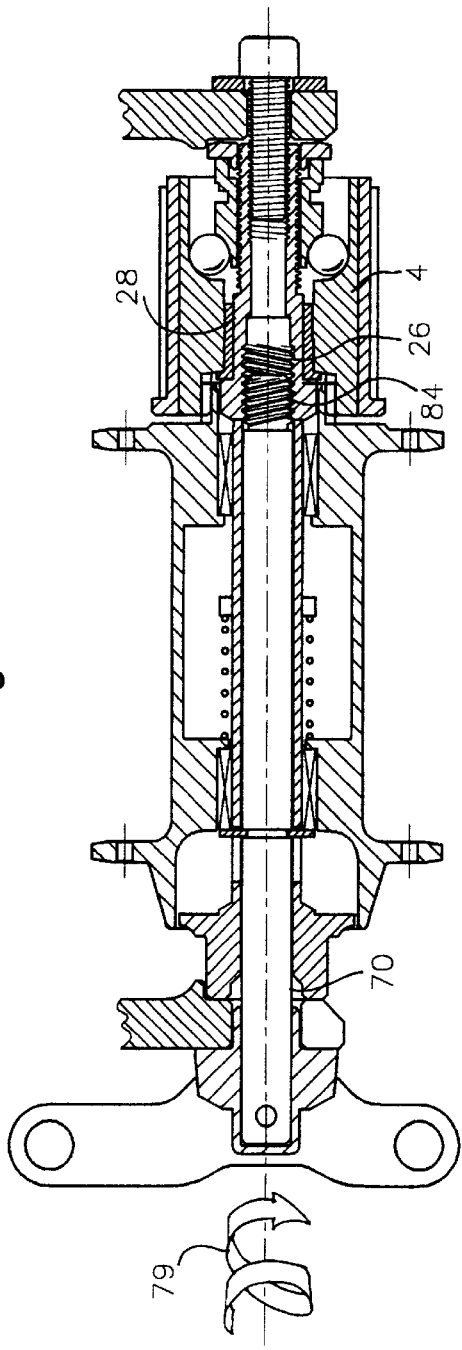
Fig. 2c
Fig. 2d

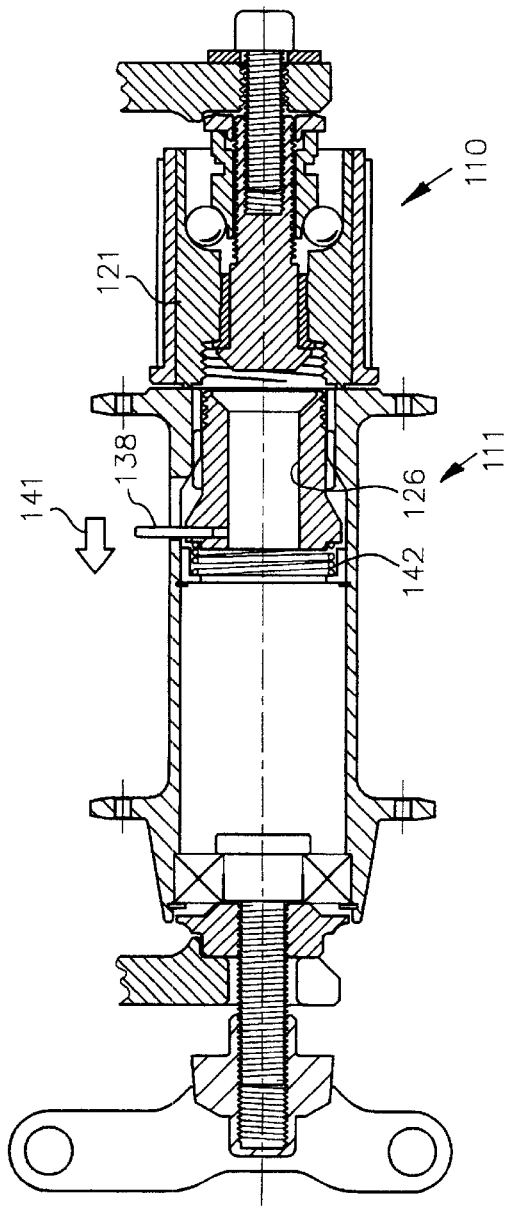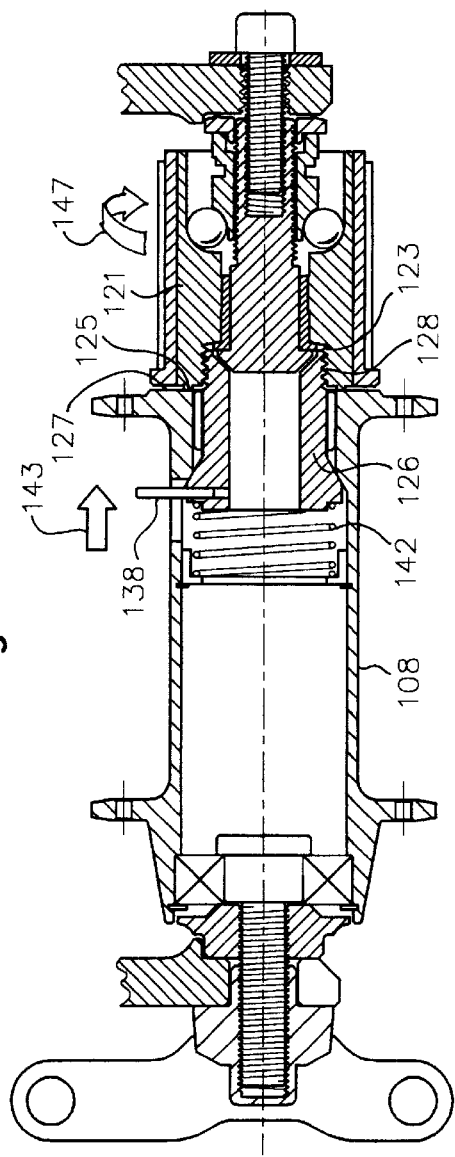
Fig. 4c
Fig. 4d

MOVABLE TORQUE COUPLING ELEMENT FOR THE TRANSMISSION OF TORQUE BETWEEN TWO COLINEAR SHAFTS

CROSS-REFERENCE TO RELATED APPLICATION

This application claims the benefit of U.S. Provisional Application Ser. No. 60/121,546, filed Feb. 25, 1999.

BACKGROUND OF THE INVENTION

The present invention relates to the attachment of the bicycle wheel to the bicycle frame, more specifically the attachment of the rear bicycle wheel to the drive sprockets in conjunction with the attachment to the frame.

Heretofore, the complete rear drive sprocket assembly is assembled to remain affixed to the rear wheel hub. Thus the rear drive sprocket or sprockets remain attached to the rear wheel when the rear wheel is removed from the frame. Whenever the wheel or tire is damaged, or when the bicycle must be taken apart for transport, the wheel must be removed from the frame. Such an operation is likely to be required rather frequently.

Since the chain remains with the bicycle frame when the wheel is removed, it is no longer under the tension normally supplied by the wheel sprocket. The chain now tends to dangle and drag on the ground, picking up contaminants and spreading grease onto the surfaces that it comes in contact with. The lack of chain tension also causes it to fall off of the front sprockets and become tangled.

Reassembly of the wheel to the frame is also problematic, requiring a great degree of skill and dexterity. As the wheel is assembled to the bicycle frame, the operator must insure that the chain is properly guided through a series of sprockets and pulleys associated with the rear sprockets, the front chainwheel and the rear derailleur. Further, the present state of the art involves a rear sprocket assembly with as many as nine sprockets, each selectable via the rear derailleur. Upon reassembly of the rear wheel, the operator must insure that the derailleur is set to the outermost sprocket and that the chain is wrapped around this specific sprocket and also insure that the chain has not inadvertently become disengaged from any of the other sprockets in the drivetrain. This is often a daunting and messy task for most cyclists. While removal of the bicycle front wheel is a relatively easy operation that may be contemplated by the novice cyclist, removal of the rear wheel is considered to be an intimidating procedure better left to the professional or an enthusiast more fluent in the mechanics of the bicycle.

The rear wheel sprockets are commonly mounted to the conventional rear hub through a "freewheel" subassembly where the sprockets are mounted to a one-way clutch, which is then threaded onto a collar of the rear hub shell. The current state of the art involves a variation on this design and is termed a "freehub", where the one-way clutch has a splined outer shell that is semi-permanently assembled to the rear hub. This clutch subassembly in commonly referred to as a freehub body. The individual sprockets are then slid over this splined shell to complete the rear hub assembly. Further description will focus on the freehub type of arrangement although the present invention is easily adaptable to the freewheel configuration or to any other arrangement with similar function, including a sprocket assembly that is fixed directly to the hub without a clutch.

SUMMARY OF THE INVENTION

The present invention involves a decoupling engagement mechanism between the one-way clutch assembly of the freehub, commonly referred to as the freehub body, and the rear hub shell, which is the outer rotating member of the rear hub. Thus, when the rear hub is removed from the bicycle frame, the freehub body, and its associated sprockets, remain attached to the frame. With the sprockets still in place, the chain remains under tension with the rear wheel removed. Thus, all of the problems associated with the dangling chain and the complex reassembly are eliminated. This greatly reduces the difficulty involved in replacement of the rear wheel and also solves the shortcomings previously described that are associated with the conventional hub assembly.

In the ensuing descriptions, the term "axial" refers to a direction parallel to the centerline of the wheel axle and the term "radial" refers to a direction perpendicular to the centerline of the wheel axle.

It should be recognized firstly that the freehub body must be coupled to the hub shell to transmit torque to the rear hub and secondly that the rear hub is mounted to the frame at the two exposed ends of its stationary axle. Thus, the wheel is commonly assembled to the bicycle frame in a generally radial direction with the axle ends residing in slots within the flattened portions of the frame commonly referred to as dropouts. These dropouts generally have a fixed distance of separation, leaving a predefined axial width assigned to the rear hub.

While the notion of such a decoupled sprocket arrangement is not new, most torque coupling arrangements require some degree of axial interference or overlap between the driving and driven elements in order to transmit torque. Previous designs required that the bicycle frame must be flexed and the dropouts spread so that the mating splines between the hub and the drive sprockets become disengaged to facilitate removal of the wheel. Such an arrangement adds difficulty to the procedure of disassembly of the wheel from the frame and leaves the frame vulnerable to overstress in this spreading process. These designs date back to the 1930's and 1940's and never saw any widespread use. Furthermore, modern bicycle frames, particularly with the advent of the mountain bike, are now constructed of much stiffer frame members that would render such a frame flexing procedure highly impractical, if not impossible.

More specifically, the present invention relates to a movable torque coupling element between the bicycle hub and the freehub body. The desired arrangement is that the sprockets are affixed to the freehub body and the freehub body is pivotally fixed to one dropout of the frame, preferably the right or "drive-side" dropout. Then the rear wheel, including the rear wheel hub, would be fitted between the right face of the left dropout and the left side of the freehub body. A torque coupling is then moved to engage the rear hub shell with the freehub body, allowing normal transmission of torque between the drive sprockets and the rear wheel. Thus, the movable torque coupling allows the overall axial width of the hub to collapse and be reduced, to the extent that it permits easy assembly and disassembly of the wheel to the bicycle frame without necessitating spread of the dropouts. The moveable torque coupling is then shifted into engagement with the freehub body, allowing the transfer of torque to the rear hub. In any transmission of torque, there is a driving element and a driven element. Since power is transmitted from the rider through the sprockets, the freehub body would be considered as the driving element and the rear hub, which applies the torque to the tire, would be considered the driven element.

Such a movable torque coupling may be designed to function in a variety ways. The torque coupling may be a passive element, for example one which is spring loaded, allowing the torque coupling to retract out of engagement during disassembly or reassembly of the rear wheel to the frame. Upon assembly of the rear wheel to the frame, the coupling element would be urged by the spring to snap into engagement with the freehub body and couple the transmission of torque between the sprocket and the wheel. One example of such an arrangement is illustrated in FIG. 6.

Alternatively, the torque coupling may be actively displaced or pushed into the engaged and/or disengaged position by any number of means. An example of such active torque coupling displacement is illustrated in FIGS. 1a–d where the torque coupling element is selectively manipulated and moved into an engaged or a disengaged position by a control shaft. In the engaged position, the freehub body is coupled to the rear hub to transmit torque, and in the disengaged position, the freehub body is uncoupled from the rear hub to allow wheel removal from the bicycle frame. Such an active torque coupling element may be manipulated by any combination of mechanical or electromechanical means including, but not limited to, cams, levers, shuttles, latches, etc.

While most discussion throughout this disclosure focuses on bi-directional torque coupling, where torque is transmitted from one element to another to drive, or be capable of driving, in both clockwise and counterclockwise rotating directions, it is also envisioned that such a torque coupling may be configured to transmit torque in only one direction of rotation and allow a freewheeling decoupling of the two members in the opposite direction of rotation. Thus, as shown in FIG. 6, it is feasible to incorporate the one-way clutch mechanism within the torque coupling itself, replacing the clutch mechanism normally located within the freehub body.

BRIEF DESCRIPTION OF THE DRAWINGS

The present invention will be more readily understandable from a consideration of the accompanying drawings, wherein:

FIGS. 1a–d show one embodiment of the present invention in axial cross-section;

FIGS. 2a–d show an alternate embodiment of the present invention in axial cross-section;

FIGS. 4a–d show a still further alternate embodiment of the present invention in axial cross section;

DESCRIPTION OF THE PREFERRED EMBODIMENTS

FIGS. 1a–d describe the preferred embodiment of the present invention in sequential stages of assembly between the rear wheel and the frame of the bicycle. The mechanism is shown in axial cross section in these figures.

Figure 1A:
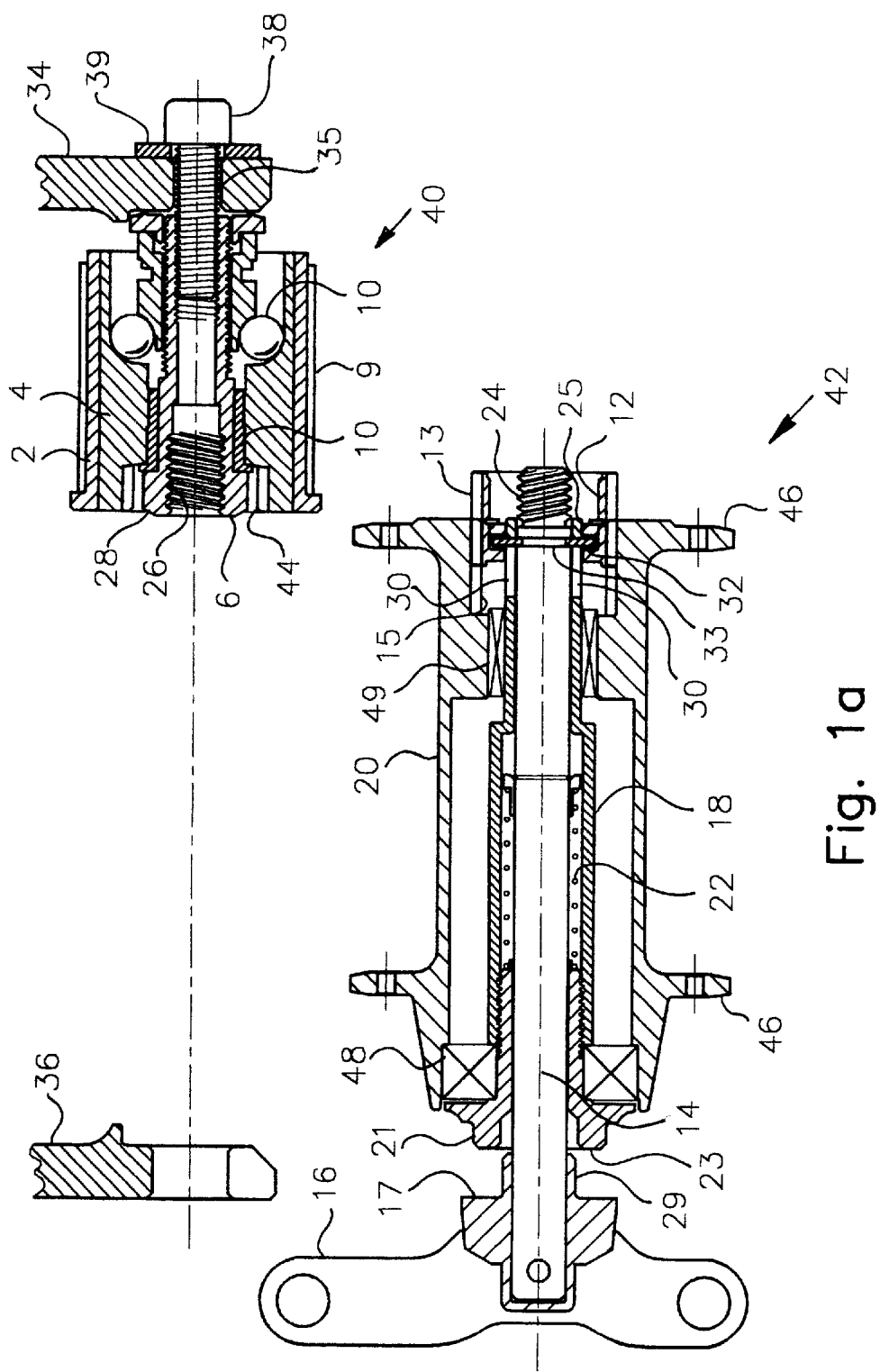

In FIG. 1a, the bicycle hub assembly 42 is shown as disassembled and separated from the dropouts 34 (right dropout) and 36 (left dropout) and the freehub body assembly 40. The freehub body assembly 40 is composed of three concentric cylindrical members, the freehub axle 28, the torque shell 4, and the freehub shell 2, which may each rotate relative to each other about the same axis. At the center is the freehub axle 28, which remains stationary and is fixed to the right dropout 34 via fixing bolt 38 and washer 39. Note that the right dropout includes a hole 35 therethrough for passage of fixing bolt 38. Since wheel removal does not require removal of the freehub assembly 40, such a through hole arrangement is preferable, since an enclosed hole 35 is more structurally robust than the open slot more commonly associated with the right dropout 34. Of course, the arrangement shown in this figure could be easily fitted to a slotted dropout as well. The Freehub axle 28 has a left face 6 and internal threads 26 that mate with the external threads 24 of the control shaft 14 upon assembly. The torque shell 4 surrounds the freehub axle 28 and includes internal splines 44 that extend axially and mate with the external splines 13 of torque coupling 12 upon assembly. The torque shell 4 is rotatable about the freehub axle 28 via bearings 10. The freehub shell 2, which carries the drive sprockets, is coupled to the torque shell 4 via a one-way clutch (not detailed here), allowing these two components to be locked to each other in the drive direction of rotation and to freewheel in the reverse or freewheeling direction of rotation. The freehub shell 2 also includes outer splines 9 to mate with the drive sprockets (not shown).

The hub assembly 42 includes an outer hub shell 20 which functions much the same as a conventional bicycle hub shell in that it includes flanges 46 for attachment of the spokes (not shown) which are fixed, at their outer ends, to the rim (not shown), to which a tire is fitted. The hub shell 20 is rotatable about the outer axle 18 via bearings 48 and 49. Axle cap 21 includes a radial face 23 and is threaded into the outer axle 18 to capture the inner race of bearing 48. Concentric within the outer axle 18 is the control shaft 14, which is both slideable (axially) and rotatable within the outer axle 18. The control shaft 14 includes a handle 16 on its left end for user manipulation and a radial face 17, which contacts the left dropout 36 upon assembly. External threads 24 on the right end of the control shaft 14 serve to engage with the internal threads 26 of the freehub axle 28 upon assembly. A compression spring 22 is fitted between the control shaft 14 and the outer axle 18 so that the control shaft is biased to the right to aid in assembly. Engaged within snapring groove 33 in the control shaft 14 is snapring 32 that extends outside of the outer axle 18 through two openings 30 therein. This snapring 32 engagement is detailed more clearly in the axial view of FIG. 1e. The torque coupling 12 engages the outer periphery of the snapring 32. The torque coupling 12 includes axial splines 13 on its outer cylindrical surface and which mate with the torque shell 4 upon assembly. Internal splines 15 of the hub shell 20 are in constant engagement with splines 13, allowing the torque coupling 12 to shuttle axially while maintaining rotational engagement. As shown in FIG. 1a, the control shaft 14 is shuttled to the right and the torque coupling 12 is extended outside of the hub shell 20. It should be noted, that in this embodiment, the control shaft 14 serves as a stationary axle for the hub assembly 42, with the outer axle 18 serving as an axial spacer and an axle supporting sleeve.

Figure 1B:
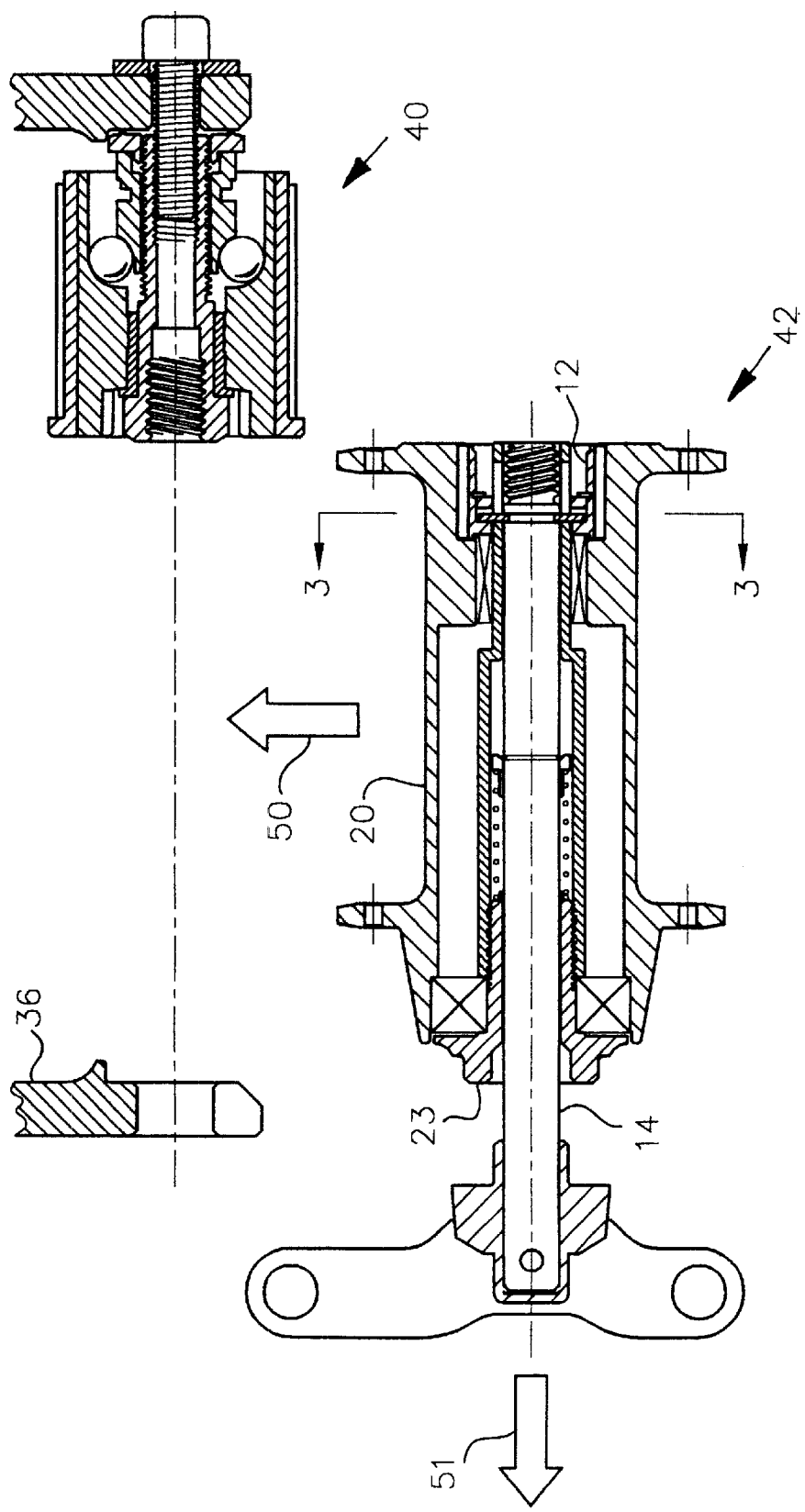

In FIG. 1b, the control shaft 14 is shuttled to the left, in the direction of arrow 51, relative to the outer axle 18 and in preparation for assembly between the left dropout 36 and the freehub assembly 40. This serves to retract the torque coupling 12 within the hub shell 20 and compress the spring 22. With the torque coupling 12 retracted as shown in this figure, the entire hub assembly 42 may now be moved radially, in the direction of arrow 50, and fitted between the left dropout 36 and the freehub body assembly 40. This is described in FIG. 1c, which shows the hub assembly 42 in the assembly position prior to final engagement of the control shaft 14.

With the hub assembly 42 in the proper position, as show in FIG. 1c, the control shaft 14 is then manually shuttled to the right and rotated clockwise as indicated by arrow 52 and as shown in FIG. 1d. This serves to engage the threads 24 of the control shaft 14 with the mating threads 26 of the freehub axle 28 and to axially shuttle the torque coupling 12 so that its outer splines 13 engage with the mating splines 44 of the torque shell 4. As the handle is tightened, the right end face 25 of the outer axle 18 is pressed against the left end face 6 of the freehub axle 28 and the left dropout 36 is clamped between the radial face 17 and the left end radial face 23. Thus the hub assembly 42 is solidly sandwiched and fastened within the dropouts 34 and 36 of the bicycle frame. Additionally, the torque coupling 12 is shuttled by the control shaft 14 to engage both the torque shell 4 and the hub shell 20 via splines 13, 44 and 15. The wheel and associated hub assembly is now solidly assembled to the bicycle frame and driving torque may be transmitted between the freehub shell 2 and the hub shell 20 via torque coupling 12. Wheel removal is the reverse of the procedure described in FIGS. 1a–d.

Figure 1E:
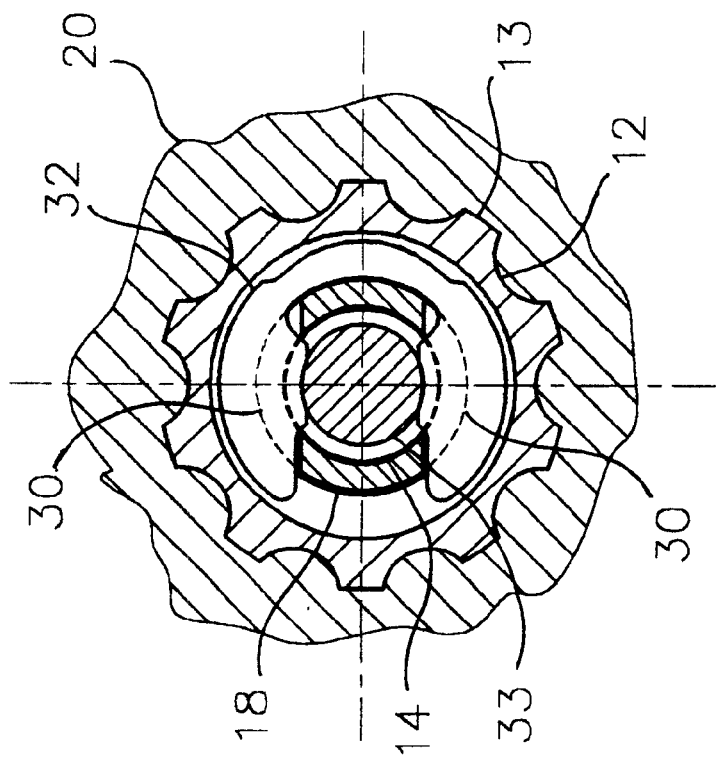
FIG. 1e shows the embodiment of FIGS. 1a–d in partial cross section view indicated by section lines 3—3 in FIG. 1b.

FIG. 1e is an axial cross section view through the snapring groove 33, showing the snapring 32 in plan view. It may be seen that the snapring 32 is assembled to the control shaft 14 in a radial direction. This figure describes how snapring 32 is captured by snapring groove 33 of control shaft 14 and extends though the two openings 30 in the outer axle 18 to engage with the torque coupling 12. Since the base of snapring groove 33 is circular, the control shaft 14 may be rotated without transmitting rotation to the snapring 32. It is through this engagement that the axial motion of the control shaft 14 may be linked to axial motion of the torque coupling 12 while the outer axle remains axially fixed to the hub assembly 42.

Figure 1F:
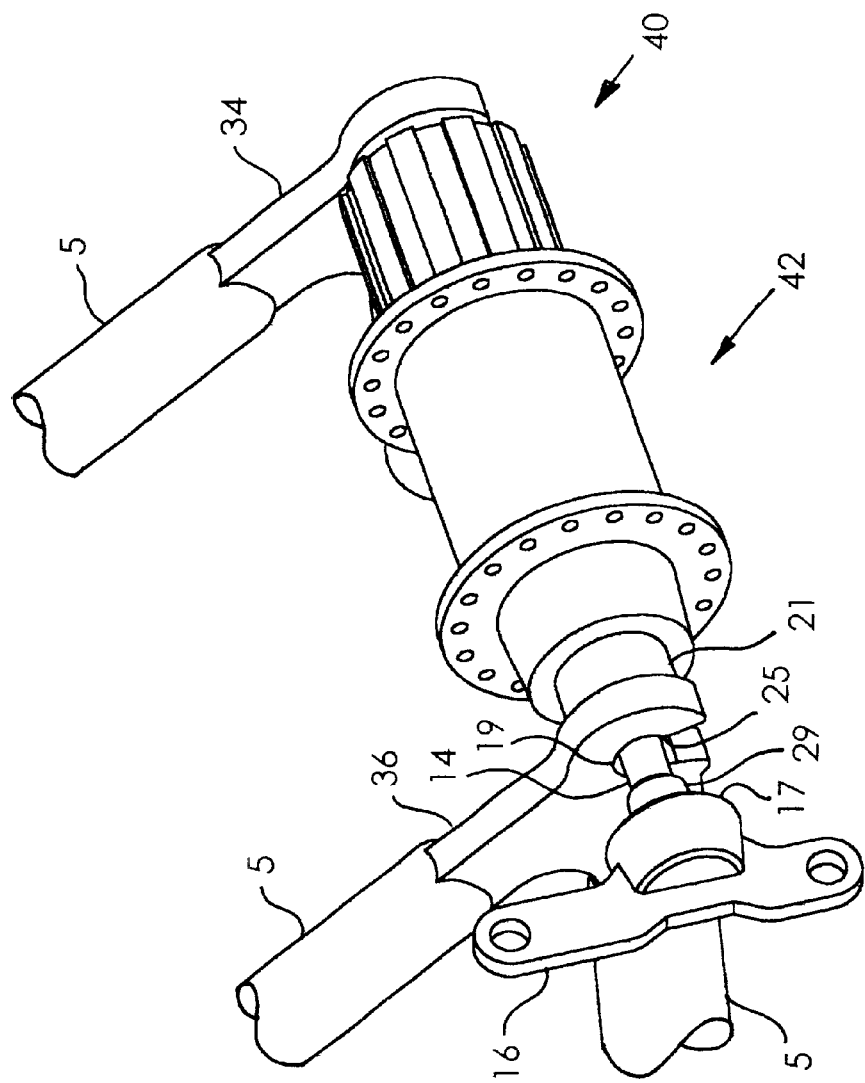
FIG. 1f shows a perspective view of the embodiment of FIGS. 1a–e, roughly corresponding to the sequence described in FIG. 1c.

FIG. 1f is a perspective view, showing the assembly of FIGS. 1a–e roughly in the position described in FIG. 1c. Frame portions 5 are shown attached to the dropouts 34 and 36 in this view. As shown in this figure, handle 16 includes collar 29 extending from radial face 17. The outside diameter of collar 29 is larger than the outside diameter of the control shaft 14. Left dropout 36 includes an enlarged circular opening 19 sized to provide a clearance fit with the outside diameter of the collar 29. Slot 25 in dropout 36 is smaller in width than the circular opening 21 and is sized to provide a clearance fit for assembly with the control shaft 14. The hub assembly 42 may be radially assembled to the left dropout 36, during the assembly sequence described in FIG. 1b and FIG. 1c, with the shank of the control shaft 14 passing through slot 25. When the control shaft is subsequently shuttled to the position shown in FIG. 1d, the collar enters the circular opening 19 and is radially retained therein. The axial length of the collar 29 may be adjusted such that, during the wheel removal procedure, the threads 24 on the right end of control shaft 14 become disengaged from the freehub axle 6 at the same point as the collar 29 becomes disengaged from the left dropout 36. The benefit here is that both ends of the control shaft 14 become simultaneously axially disengaged. This allows the wheel to be easily removed in the radial direction without one end being hung up and causing the wheel to cock or become wedged in the frame. This type of engagement is also a safety feature, insuring that the wheel will not fall out or shift, should the control shaft 14 be inadvertently loosened.

FIGS. 2a–d describe an alternate embodiment where the torque coupling 62 is fixed to the hub shell 64. These figures roughly correspond to FIGS. 1a–d and describe sequential stages of assembly of the rear wheel to the frame of the bicycle. The mechanism is shown in axial cross section in these figures.

Figure 2A:
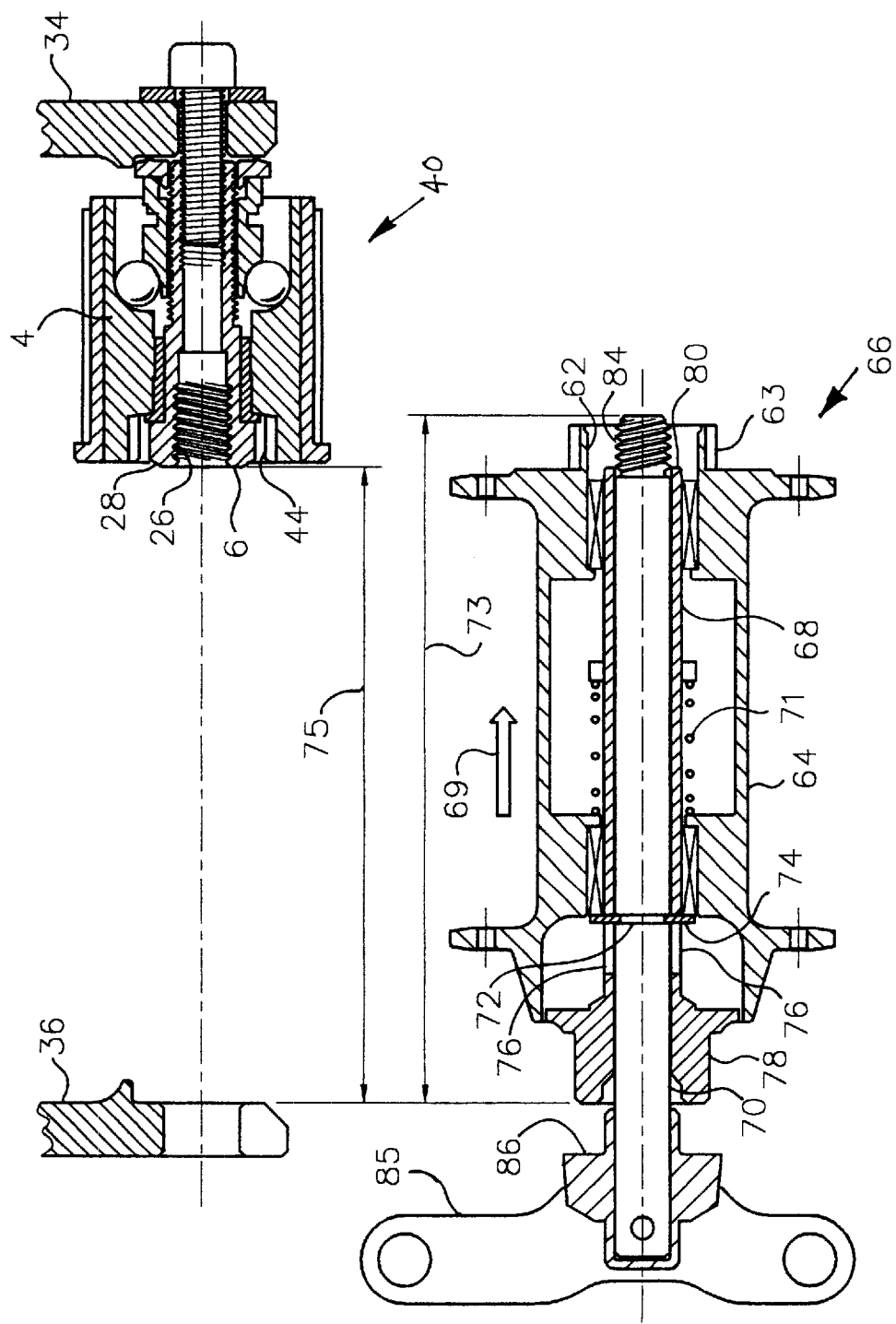

The freehub assembly 40 is identical to that described in FIGS. 1a–d. The hub assembly 66 includes many components similar to ones previously described; however they are arranged here somewhat differently. FIG. 2a describes the hub assembly 66 with the hub shell 64 shifted axially to the right, as indicated by arrow 69, relative to the outer axle 68. The control shaft 70 includes handle 85 with right side radial face 86 at its left end and external threads 84 at its right end, which are intended to engage with internal threads 26 of the freehub axle 6. It should be noted that internal threads may be substituted for external threads 84 and correspondingly, external threads may be substituted for the internal threads 26 to provide a similar function. The hub shell 64 includes torque coupling 62 and splines 63 intended to mate with splines 44 of the torque shell 4 upon assembly.

The outer axle 68 includes an axle cap 78 at its left end and an end face 80 on its right end. The outer axle 68 also includes elongated openings 76 through which the snapring 74 communicates and is engaged with the snapring groove 72 of the control shaft 70. This is much the same as the snapring engagement described in FIG. 1e, however in this case, the snapring 74 serves to link the axial movement of the control shaft 70 with the hub shell 64 in a manner similar to the connection between the control shaft 14 and the torque coupling 12 of FIG. 1a. Thus, it may be considered that, in some respects, the hub shell 64, including the fixed torque coupling 62, is a substitute for the moveable torque coupling 12 of FIG. 1a. Instead of the independent torque coupling 12 being shifting axially into engagement with the torque shell 4, the entire hub shell 64, including its fixed torque coupling 62 portion, is shifted in a similar manner. A compression spring 71 is included, serving to bias the hub shell 64 and control shaft 70 to the left relative to the outer axle 68. As compared to spring 22 of FIGS. 1a–d, which serves to bias hub assembly 42 to the engaged position, spring 71 serves to bias hub assembly 66 to the disengaged position. Note that, in FIG. 2a, the hub assembly 66 is shown in its extended position as indicated by dimension 73, with spring 71 compressed. In this position, the hub assembly 66 is too wide to fit between the left dropout 36 and the freehub assembly 40 as indicated by dimension 75.

Figure 2B:
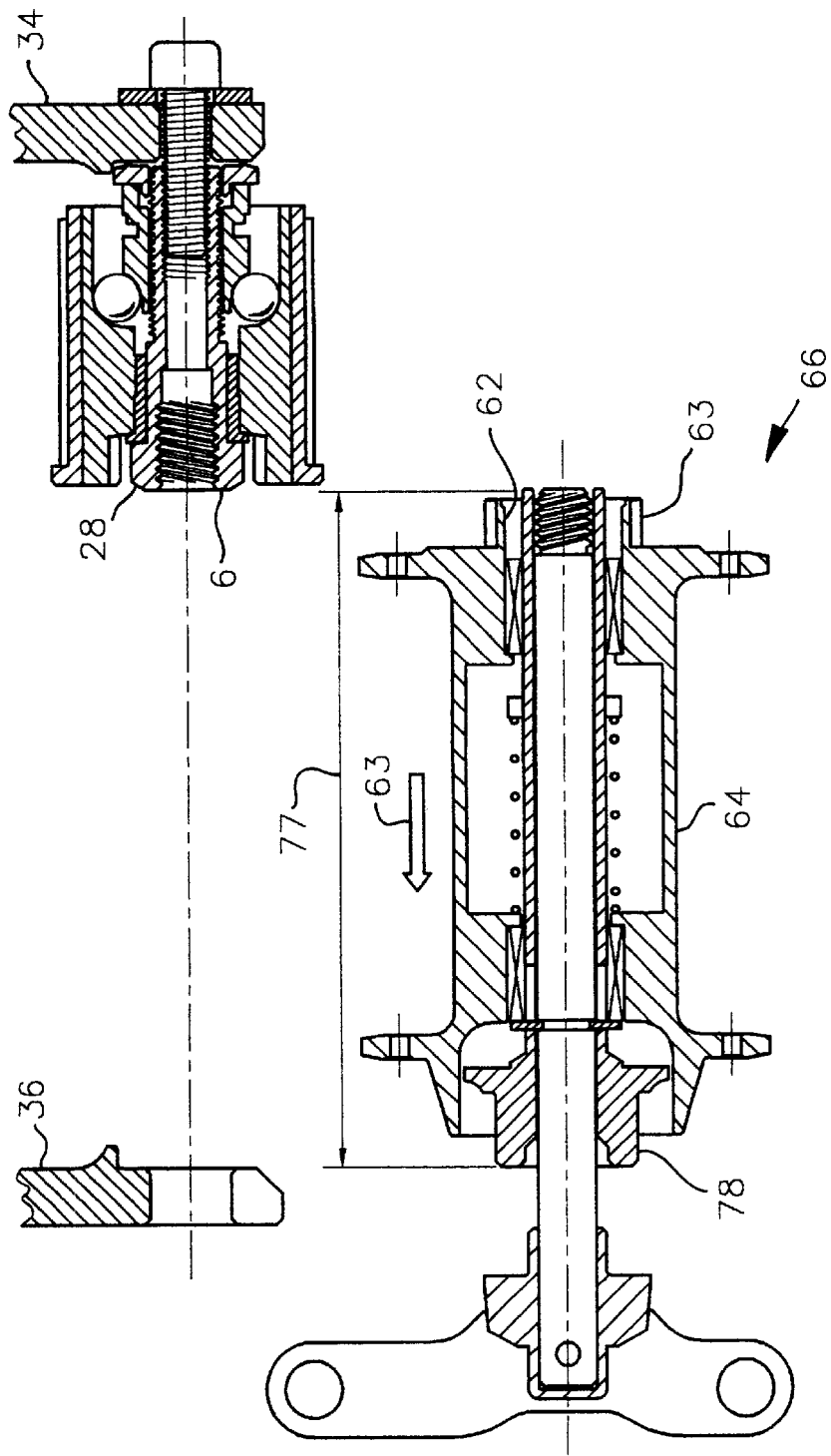

FIG. 2b describes the hub assembly 66 prior to assembly to the dropouts 34 and 36 of the bicycle frame where the hub shell 64 is shifted axially to the left relative to the outer axle 68 as indicated by arrow 63. Thus the left end of the hub shell 64 is retracted over the axle cap 78 and the right face of the torque coupling 62 is approximately flush with the right end face 80 of the outer axle 68. This reduces the overall width of the hub assembly 66, as indicated by dimension 77, allowing it to fit between the left dropout 36 and the left end face 6 of the freehub axle 28. The compression spring 71, between the hub shell 64 and the outer axle 68, serves to bias the assembly to this position, permitting greater ease of operation for the user. The hub assembly 66 may now be moved into position for assembly as shown in FIG. 2c where the hub assembly 66, still in the retracted position of FIG. 2b, is located between the left dropout 36 and the freehub axle 28.

With the hub assembly 66 in the position shown in FIG. 2c, the operator may then use the handle 16 to shift the control shaft 70 to the right as indicated by arrow 65, also rotating it clockwise, as indicated by arrow 79 of FIG. 2d, to engage the external threads 84 of the control shaft 70 with the internal threads 26 of the freehub axle 28. This threaded engagement serves to draw the control shaft 70 to the right which, in turn, shifts the hub shell 64 to the right as well, via snapring 74, engaging the splines 63 of torque coupling 62 with the mating splines 44 of the torque shell 4 as shown in FIG. 2d. With the control shaft 70 firmly tightened in position, the left dropout 36 and the outer axle 68 are clamped between the radial face 86 of the control shaft 70 and the left face 6 of the freehub axle 28. The hub shell 64 and the torque coupling 62 are now assembled in the proper position and engagement with the torque shell 4, allowing torque to be transmitted between the drive sprockets and the hub shell 64.

Figure 3:
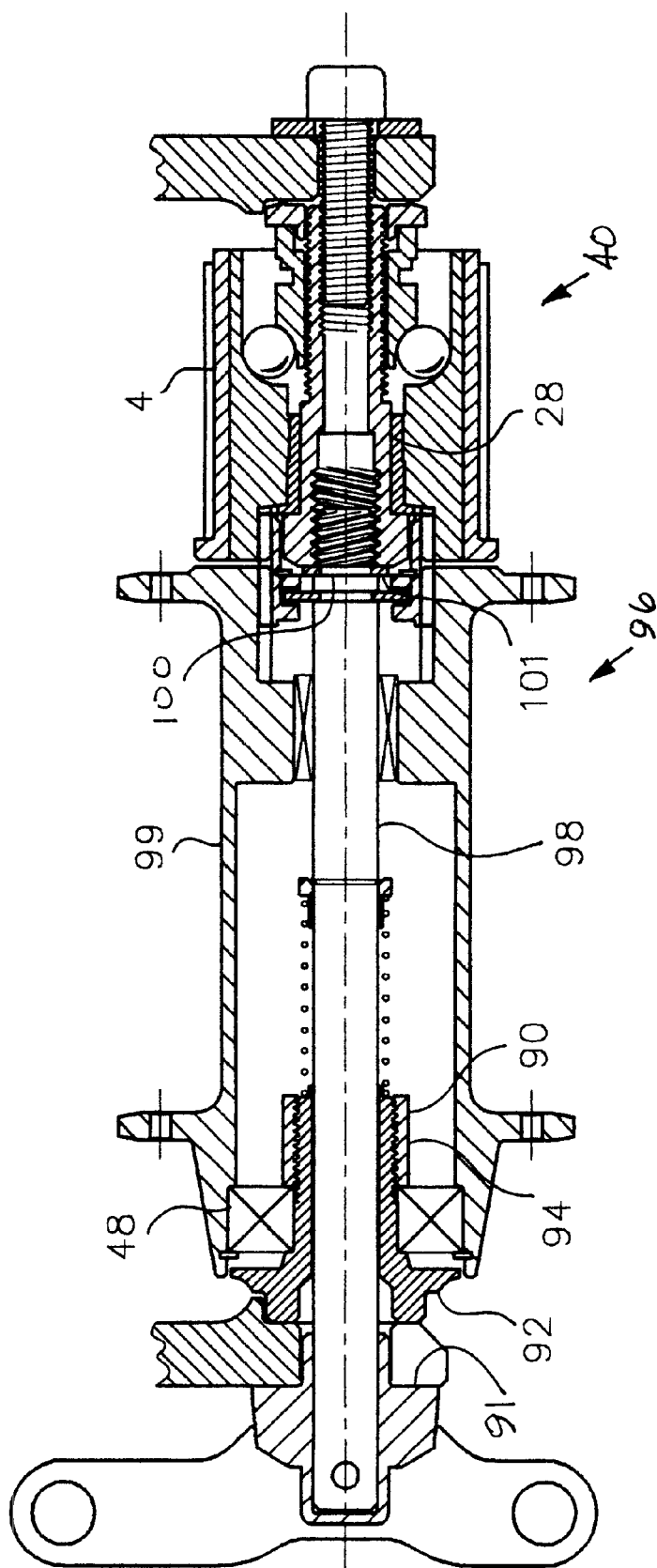
FIG. 3 shows a further alternate embodiment of the present invention in axial cross-section.

FIG. 3 describes an alternate embodiment similar to FIG. 1d and is also shown in axial cross section. In many respects, this embodiment is identical to the embodiment described in FIGS. 1a–d, but is a somewhat simpler design. Freehub assembly 40 is identical to that described in FIGS. 1a–f. In this embodiment, the outer axle assembly 90 includes an axle cap 92 and a nut 94, which serve to capture the inner race of the hub shell bearing 48. Note that the outer axle assembly 90 does not extend to contact the left face of the freehub axle 28. Instead, the control shaft 98 includes a snapring shoulder 100. Thus, in the assembled position shown here, the control shaft 98 is tightened until the snapring 101, fitted to the snapring shoulder 100, bears against the left face 6 of the freehub axle 28. Thus, the snapring 101 provides an axial limit stop for the control shaft 98. Unlike the assemblies described in FIGS. 1a–f and FIGS. 2a–d, the outer axle assembly 90 and the left dropout 36 are not clamped between the radial face 91 of the control shaft 98 and the left face 6 of the freehub axle 28, but instead are merely located between these two components with no clamping pressure applied. Obviously this provides a somewhat less firm connection than described in previous figures and relies more on the stiffness of the bicycle frame to reduce flexure or movement between components.

Although not shown here, it is also envisioned that the snapring shoulder 100 and snapring 101 of the control shaft 98 may be eliminated, thus eliminating the hard axial stop in the threadable mating between the control shaft 98 and the freehub axle 28. In this case, further tightening of the control shaft 98 would force the right face of the hub shell 99 to contact the torque shell 4. Tightening still further will tend to axially preload the bearing 48 of the hub assembly 96 and bearing 10 of the freehub assembly 40. Normally such an axial preload results in accelerated bearing wear, however an angular contact bearing or thrust bearing may be utilized in this assembly to withstand the detrimental effects of such a high axial load.

FIGS. 4a–d describe yet another alternate embodiment of the present invention, again shown in axial cross section. These figures describe an embodiment wherein the movable torque coupling 126 serves to transmit torque between the freehub assembly 110 and the hub shell 108, as well as to axially and radially lock these two components together.

Figure 4A:
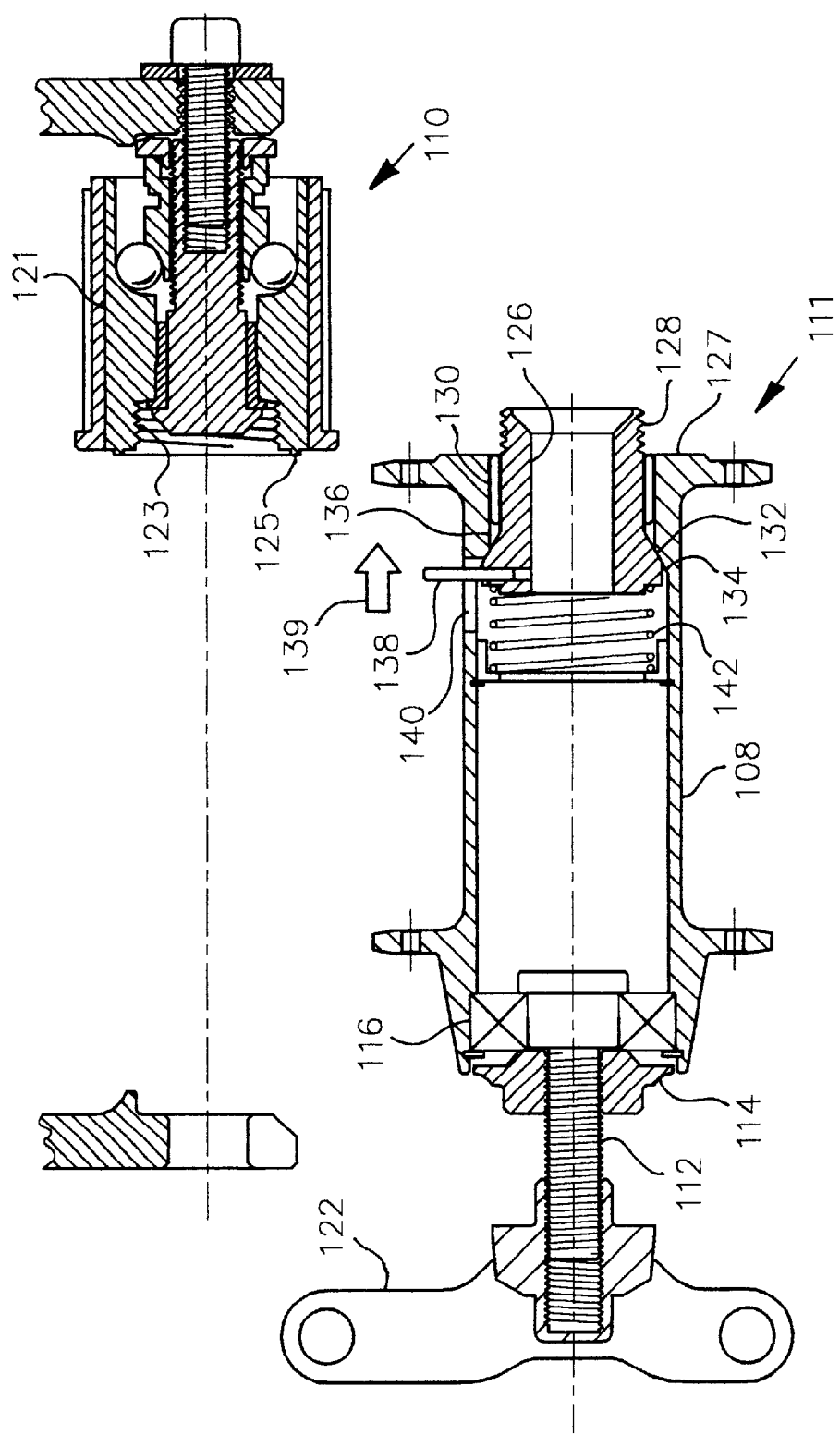

The freehub assembly 110 of FIG. 4a is identical to the freehub assembly 40 of previous figures in some respects; however, the torque shell 121 now includes internal threads 123, intended to mate with the external threads 128 of torque coupling 126. Torque shell 121 also includes left face 125.

In this embodiment of the hub assembly 111, the control shaft 14 and outer axle assembly 18 of FIG. 1a are eliminated in favor of an axle half assembly 112, which includes an axle cap 114 and a wing nut assembly 122. The hub shell 108 includes right face 127 and is rotatable about the axle half assembly 112 via the bearing 116. The inner race of the bearing 116 is captured within the axle half assembly 112 and the outer race is captured by the hub shell 108 as shown. The torque coupling 126 is engaged to the hub shell 108 via mating axial splines 130 of the torque coupling and 136 of the hub shell, and includes a conical face 132, which is matched to a corresponding conical face 134 in the hub shell 108. The torque coupling 126 includes an operating pin 138, which protrudes through the elongated opening 140 of the hub shell 108, and extending therefrom to be accessible by the user. The torque coupling 126 is axially biased to its right limit within the hub shell 108 by the compression spring 142 such that the conical faces 132 and 134 are in contact and the operating pin 138 is shifted to the right, as indicated by arrow 139. The torque coupling 126 also includes external threads 128 in its protruding portion, which are intended to mate with the internal threads 123 of the torque shell 121. On the left end of the hub assembly 124, the wing nut assembly 122 is shown as unscrewed part way from the axle half assembly 112.

Figure 4B:
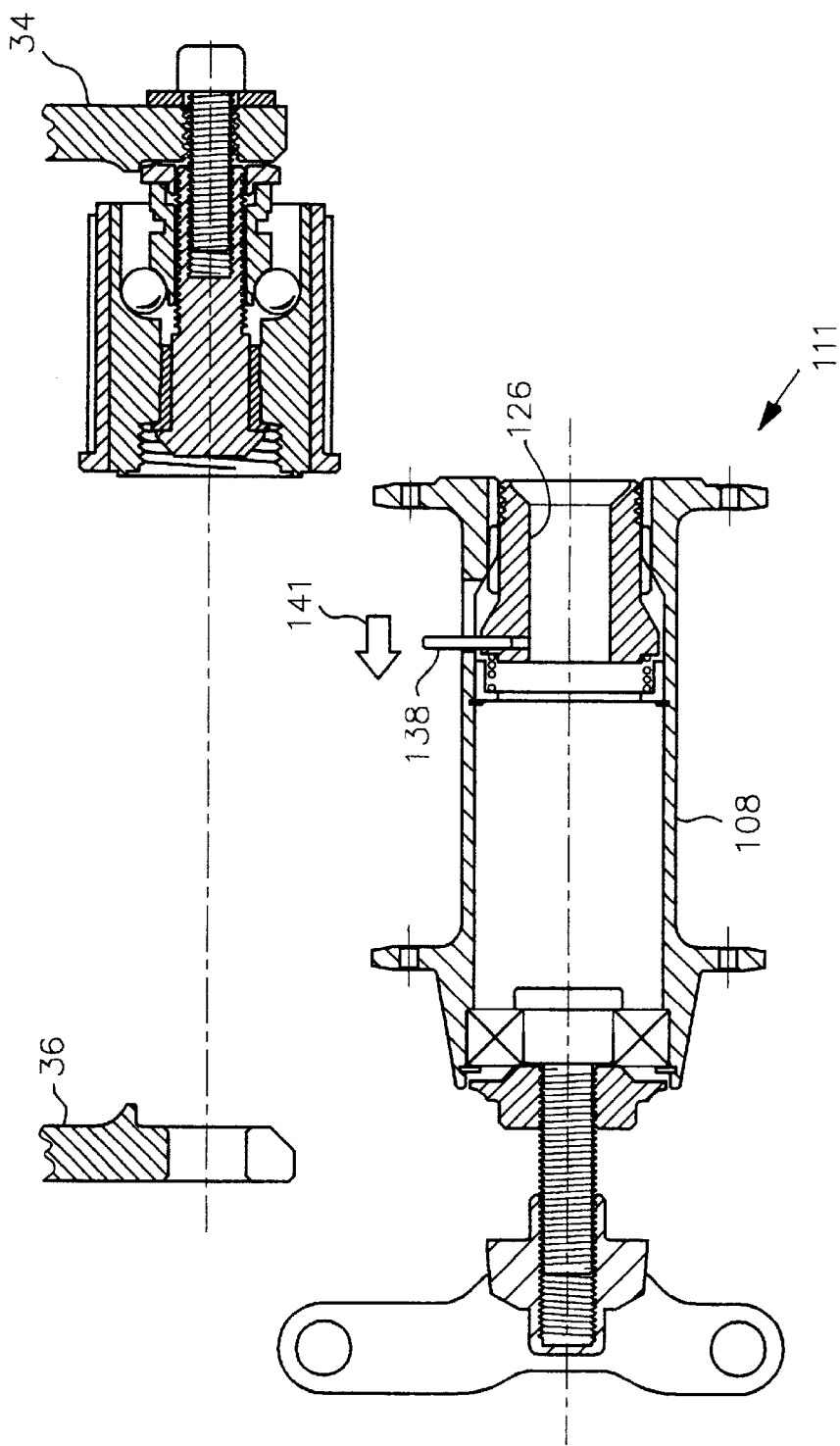

In FIG. 4b, the user has manipulated the operating pin 138, moving it to the left as indicated by arrow 141, to retract the torque coupling 126 within the hub shell 108 in preparation for assembly to the dropouts 34 and 36. The hub assembly 111 is shown in FIG. 4c to be radially moved into position between the left dropout 36 and the freehub assembly 110. The operating pin 138 is still in the left position, as indicated by arrow 141, so that the torque coupling 126 is not yet in engagement with the torque shell 121.

When the user releases the operating pin 138, as shown in FIG. 4d, the compression spring 142 pushes the torque coupling 126 to the right, as indicated by arrow 143, into contact with the torque shell 121. A preliminary rotation torque is applied to the drive sprocket, rotating the torque shell 121 relative to the hub shell 108 as indicated by arrow 147 so that the internal threads 123 mate and engage with the external threads 128 of the torque coupling 126. The threaded engagement serves to draw the torque coupling 126 further to the right, in the direction of arrow 143, until its conical face 132 contacts the mating conical face 134 of the hub shell 108 and the left end face 125 of the torque shell 121 contacts the right end face 127 of the hub shell 108. When the threads 123 and 128 are tightened, the hub shell 108 is clamped and sandwiched between the torque coupling 126 and the torque shell 121, creating a firm assembly. At the left end of the hub assembly 124, as shown in FIG. 4d, the wing nut assembly 122 is threadably tightened on the axle half assembly 112 to clamp and sandwich the left dropout 36, creating a firm assembly at the left end of the hub assembly 111. Since driving torque is transmitted in one direction only, the threaded engagement between the torque coupling 126 and the torque shell 121 is only further tightened during use and torque is effectively transmitted from the torque shell 121 to the torque coupling 126 via the threaded engagement (123, 128) and, in turn, coupled to the hub shell 108 via the splines 136 and 130. Multi-lead threads or helical splines may be substituted for the threaded engagement (123, 128) described herein for increased thread helix angle to allow easier disassembly.

Thus, as described in FIGS. 4a–d, the torque coupling may also serve a dual-purpose function, providing utility beyond simply the transmission of torque. In comparison, the embodiment described in FIGS. 1a–d utilizes a movable torque coupling 12 only to transmit torque between the torque shell 4 and the hub shell 20, and utilizes a separate control shaft 14 to axially fix the hub assembly 42 in the desired location relative to the bicycle frame and the freehub assembly 40. FIGS. 4a–d show that, in addition to transmitting torque, the torque coupling 126 itself may also serve to axially and radially fix the hub assembly 124, or portion thereof, to the freehub assembly 110. The hub assembly 124 is mounted to the left dropout 36 via a bolt-on connection or some other preferred attachment. By extending the torque coupling from the hub shell and threading that extension into the freehub body, a solid axial connection between the hub and the freehub body is created as well as an effective transmission of torque.

Figure 5A:
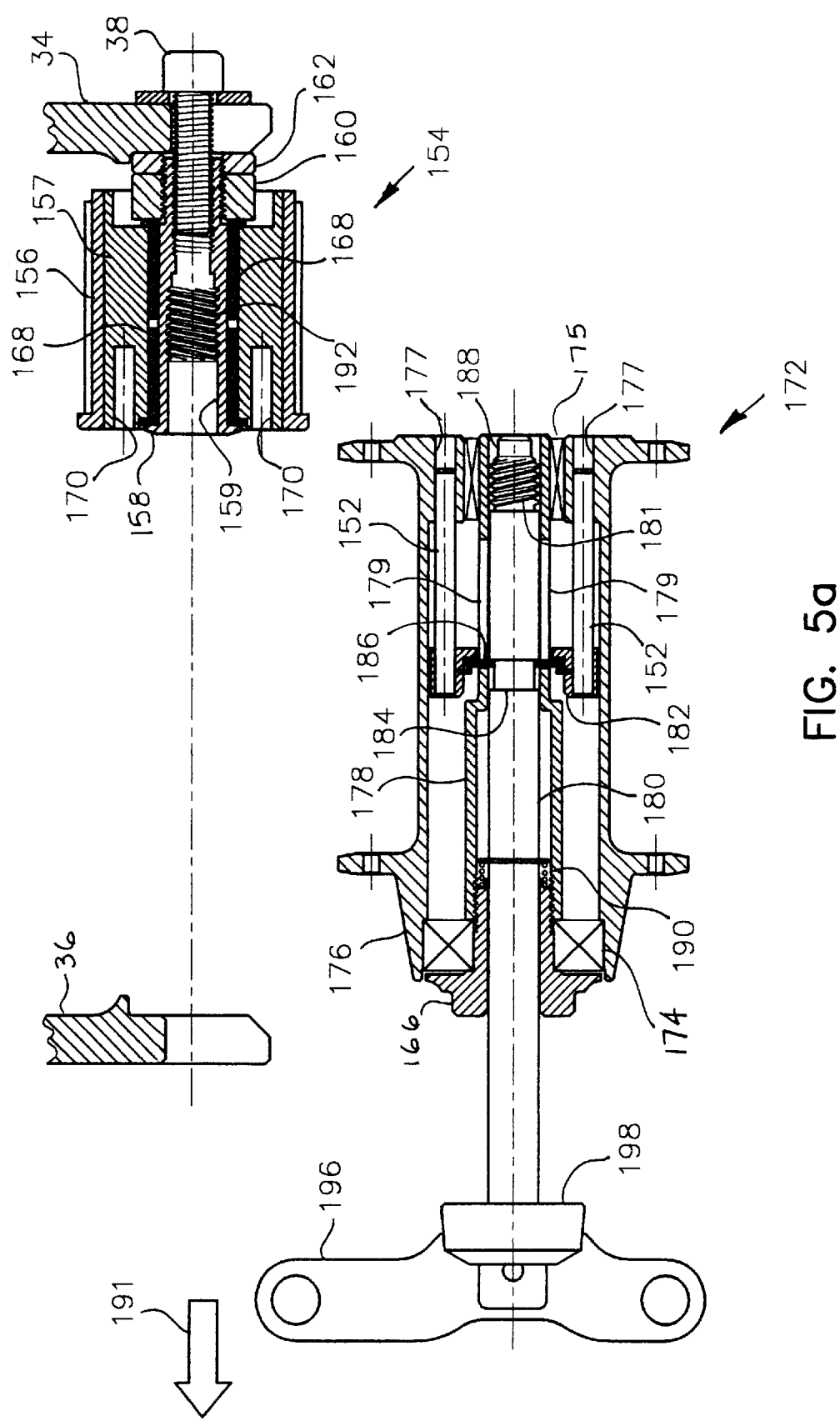
FIGS. 5a–c show a still further alternate embodiment of the present invention in axial cross section.
Figure 5B:
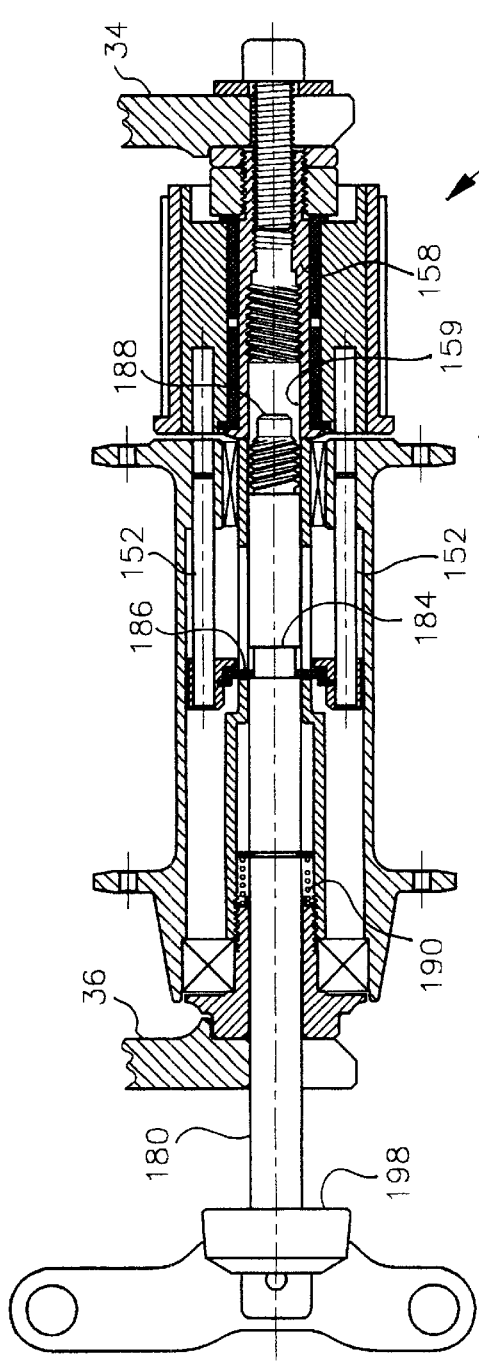
Figure 5C:
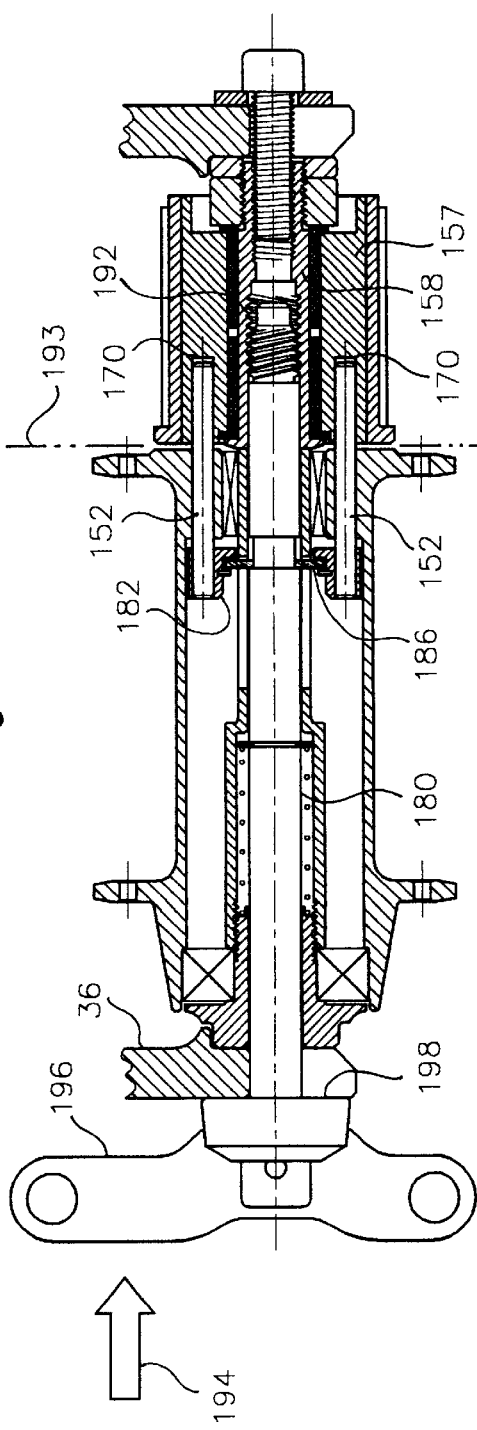

FIGS. 5a–c describe an alternate embodiment where engagement pins 152 are substituted for the torque coupling of previous embodiments. The freehub assembly 154 is similar to previous embodiments and includes a freehub shell 156 coupled to a torque shell 157 via a one-way clutch (not shown). The torque shell 157 rotates about a freehub axle 158 bidirectionally via bearings 168. The freehub axle 158 includes internal threads 192 recessed within hole 159. The axial endplay of bearings 168 are adjusted by a pair of locknuts 160 and 162, which mate with the freehub axle 158. The freehub assembly 154 is fastened to the right dropout 34 via fixing bolt 38. The torque shell 157 also includes a series of axial holes or sockets 170, which are intended to mate with corresponding pins 152 of the hub assembly 172.

The hub assembly 172 includes a hub shell 176, which rotates about the outer axle 178 via bearings 174 and 175. The control shaft 180 moves axially and is rotatable with respect to the outer axle 178 and includes snapring groove 184, to which snapring 186 is engaged. Axle cap 166 is threaded into outer axle 178 to capture inner race of bearing 174. Similar to FIGS. 1a–e, the snapring 186 extends through the elongated openings 179 of the outer axle 178 and is retained within the pin carrier 182. The pins 152 are extend through and are located within axial holes 177 in the hub shell 176 and are fixed at their left ends to the pin carrier 182. Thus, as the control shaft 180 is axially shuttled, the pin carrier 182 and pins 152 are shuttled as well. The control shaft 180 also includes a threaded portion 181 and a reduced diameter tip pilot 188 portion to pre-engage within the hole 159 in the freehub axle 158 to aid in assembly. Note that, since the pins 152 pass through the hub shell 176, the bearing 175 may be located within the pin 152 circle and axially as far to the right as possible, thereby reducing the radial loads on the bearing 174. This may be seen by comparing the bearing location in this figure with that of FIG. 1a.

As shown in FIG. 5a, the hub assembly 172 is shown in the retracted position prior to insertion between the left dropout 192 and the freehub assembly 154. The control shaft 180 is shuttled to the left as indicated by arrow 191, compressing spring 190 and retracting the pins 152 within their holes 177.

FIG. 5b shows the hub assembly 172 in the assembly location between the left dropout 36 and the freehub assembly 154. Note that the snapring groove 184 is axially wider than snapring 186, allowing the control shaft 180 to shuttle independently of the pins 152 for a portion of its axial travel. In FIG. 5b, the spring 190 has induced the control shaft to be shuttled slightly to the right with the snapring 186 now shown to be located against the left shoulder of the snapring groove 184, allowing the pins 152 to remain in the same position as shown in FIG. 5a. With the control shaft 180 shifted as shown in FIG. 5b, the reduced diameter tip pilot 188 portion is now pre-engaged and protruding within the hole 159 in the freehub axle 158. This constitutes the pre-engaged locating position described above, which aids in radially centering the hub assembly 172 within the freehub assembly 154 prior to engagement of the pins 152.

The control shaft 180 may now be shifted further to the right as indicated by arrow 194 and then rotated, in a manner similar to FIG. 1d, to engage threaded portion 181 with threads 192 as shown in FIG. 5c. As the control shaft 180 is axially shifted, the snapring 186 bears against the pin carrier 182, pushing pins 152 to the right and engaging with the mating sockets 170 of the torque shell 157. With the pins 152 locking the torque shell 157 to the hub shell 176, torque may now be transmitted between these two components (157, 176). As the control shaft is rotated and the threaded engagement (181,192) tightened via knob 196, the hub assembly 172 and the left dropout 36 are clamped between the shoulder 198 of the control shaft 180 and the freehub axle 158. A rigid assembly is thus achieved in a manner similar to FIG. 1d. Note that it may advantageous to include a greater number of sockets 170 than pins 152, such that there exist a multiplicity of possible engagement positions, permitting easier rotary alignment between pins 152 and sockets 170. Note that both dropouts 34 and 36 are shown in this figure as being of the conventional slotted configuration. This demonstrates that the present invention may be easily adapted to the standard slotted dropouts currently in use throughout industry.

It is recognized that the threaded portion 181 may create a stress riser and weakened region of the control shaft 180. The control shaft 180 is shown in FIGS. 5a–c to have additional axial travel as compared with previous embodiments. This permits the threaded portion 181 to engage the threads 192 at a point deeply recessed within the freehub axle 158, so that the weaker threaded portion 181 may be located axially beyond the more highly stressed region at the interface joint 193 between the hub assembly 172 and the freehub assembly 154. The stronger unthreaded portion of the control shaft 180 is shown here to span across this joint 193, creating a more robust final assembly.

Figure 6:
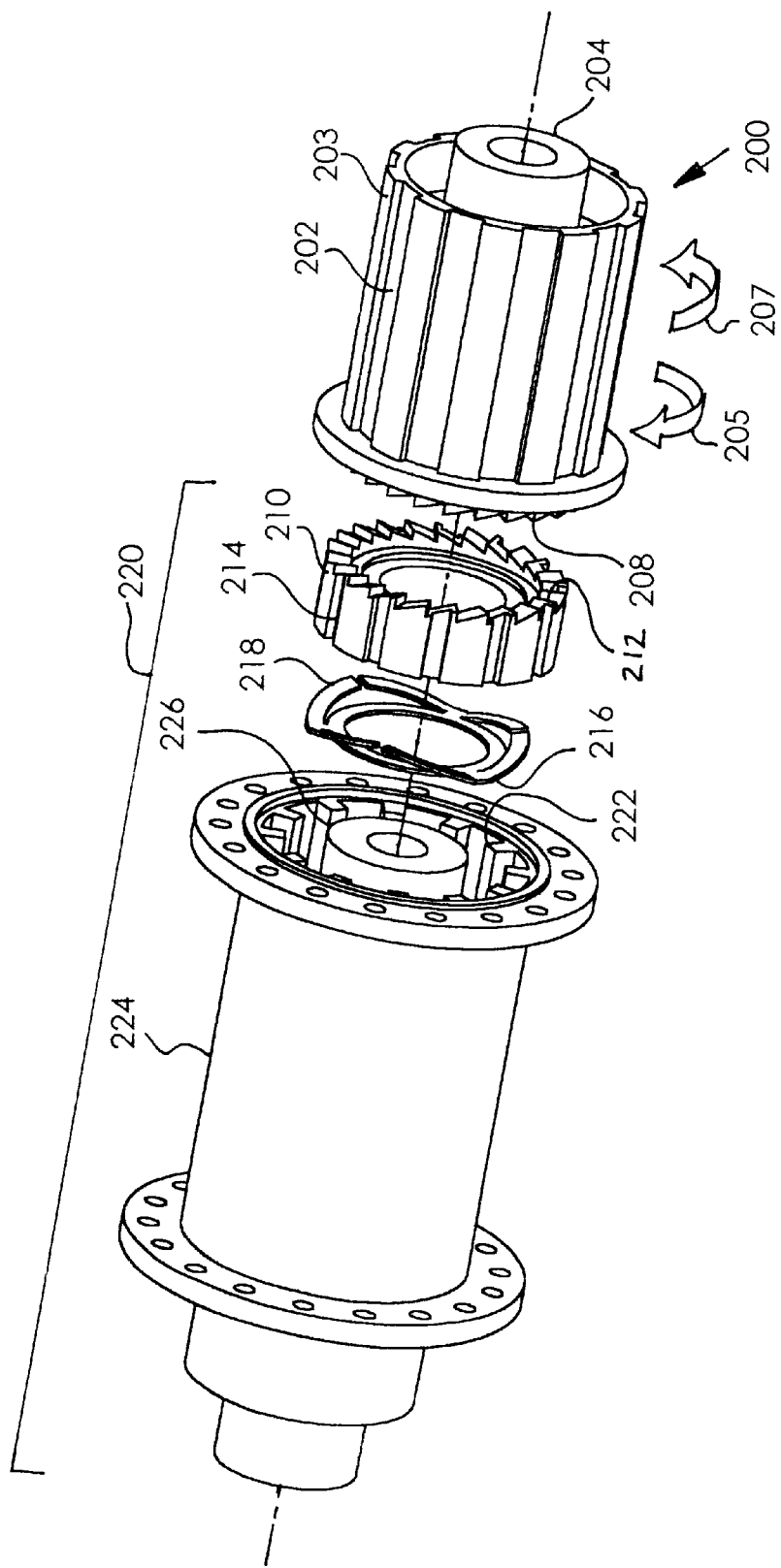
FIG. 6 shows yet a further alternate embodiment in exploded perspective view.

FIG. 6 describes an additional alternate embodiment of the present invention, including a spring-loaded torque coupling 210, which transmits torque in only one direction of motion. It should be noted that several components that have been described in previous embodiments are not shown in this figure. These omissions reduce redundancy and add clarity to the figure and it is understood that such missing components would be required for a complete assembly. Freehub assembly 200 includes the freehub shell 202 and the freehub axle 204. The freehub shell 202 includes splines 203 to mate with the drive sprockets (not shown). The freehub axle 204 is stationary and is bolted to the right dropout (not shown) in the manner previously described. Note that a torque shell is not included, nor is it required in this assembly. The hub assembly 220 includes the hub shell 224, the outer axle assembly 226, the torque coupling 210 and the coupling spring 216. Other portions of the hub assembly 220 have been omitted from this figure for clarity. The torque coupling 210 includes longitudinal splines 214 in its outer periphery to mate with longitudinal splines 222 of the hub shell 224, permitting the torque coupling 210 to shuttle axially while still transmitting torque to the hub shell 224 in a manner described in FIGS. 1a–e.

The freehub shell 202 includes face teeth 208 to mate with face teeth 212 on the torque coupling 210. The face teeth 208 and 212 have mating sawtooth profiles, as shown, to provide blocking engagement when the freehub shell 202 is rotated in the drive direction as indicated by arrow 205 and axial camming engagement when the freehub shell 202 is rotated in the freewheeling direction as indicated by arrow 207. Thus driving torque is transmitted from the freehub shell 202 to the torque coupling 210 in the driving direction of rotation 205 via the blocking engagement of face teeth 208 and 212. When the freehub shell 202 is rotated in the non-drive or freewheeling direction 207, the ramp portions of the face teeth 208 and 212 cam off of each other, serving to axially displace the torque coupling 210. The coupling spring 216 includes flex arms 218 and is situated between the hub shell 224 and the torque coupling 210 such that it serves to axially bias the torque coupling 210 against the freehub shell 202, thereby maintaining engagement of face teeth 208 and 212. Such a one-way ratcheting clutch assembly is well known in industry. Thus, this arrangement includes a one-way clutch mechanism incorporated within the movable torque coupling engagement.

A control shaft (not shown) may be used here to provide active coupling and decoupling to extend and retract the torque coupling 210 into the hub shell 224 to aid in assembly as previously described. Alternatively, a passive decoupling arrangement may be employed, where the torque coupling 210 may be induced to be retracted as much as necessary simply by assembling and wedging the hub shell assembly 220 between the left dropout (not shown) and the freehub assembly 200. As the torque coupling 210 is pressed against the freehub shell 202 during assembly, it will retract as much as necessary, compressing the coupling spring 216 to allow unimpeded assembly. The torque coupling 210 and teeth 212 will finally snap into engagement with teeth 208 as the hub assembly 220 is moved radially into the assembled position.

Figure 7:
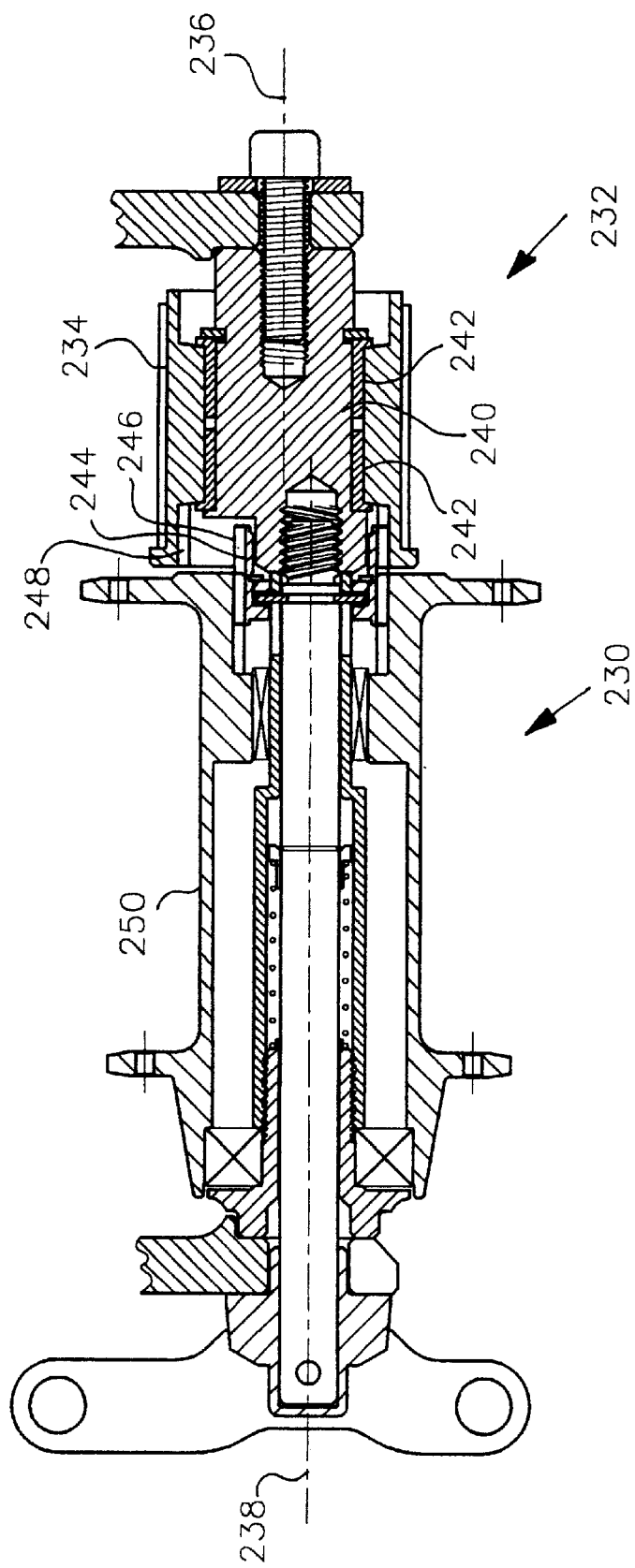
FIG. 7 shows still a further embodiment of the present invention in axial cross-section.

All of the embodiments previously described are arranged such that the rotational axis of the driving element and the rotational axis of the driven element are colinear. This is the most straightforward configuration, however it is also envisioned that a more elaborate arrangement could include non-colinear rotational axis. One such example is described in FIG. 7, which corresponds to the assembly position described in FIG. 1d, wherein the torque coupling 244 also serves as a spur gear that may be axially shifted into and out of engagement with an eccentric ring gear. As shown in FIG. 7, the hub assembly 230 is almost identical to the hub assembly 42 of FIG. 1a, however, the axial splines 246 of torque coupling 244 are shaped to have a spur gear tooth profile. Freehub assembly 232 includes an eccentric freehub axle 240. The freehub shell 234 rotates on the freehub axle 240 about rotational axis 236 via bearings 242. Incorporated into the left end of freehub shell 234 is an internally toothed ring gear 248, which is concentric with rotational axis 236 and which is intended to mate with tooth-shaped splines 246 of torque coupling 244. For the sake of clarity, no one-way clutch is included in this assembly. The hub shell 250 rotates about rotational axis 238, which is eccentric with rotational axis 236. Ring gear 248 is larger in diameter and includes more teeth than torque coupling 244, requiring the eccentricity between axis 236 and 238. Thus, a step-up gear ratio is incorporated within the engagement between the driven torque coupling and the driving freehub shell 234. For every single rotation of the freehub shell 234, the torque coupling 244 and hub shell 250 are driven by greater than a single revolution. Such an eccentric spur and ring gear drivetrain is well known in industry.

Thus, the present invention provides a movable torque coupling element that permits the drive sprockets to remain attached to the frame when the rear wheel is removed, maintaining tension in the chain. Further, the present invention prevents the chain from dragging on the ground and picking up contaminants and also prevents the chain from spreading grease to clothing and other surfaces. Further still, the present invention does not require proper placement of the chain onto the sprockets during reassembly of the wheel and does not induce the chain to fall off of the sprockets during disassembly and storage. Yet further, the present invention permits easy disassembly and reassembly of the rear wheel to the bicycle frame and reduces the level of skill required to perform this task. Further still, the present invention may provide a firm rigid assembly between the wheel, freehub and bicycle frame and is also compatible with existing bicycle frame standards. Further still, the present invention has a broad range of application, including the transmission of driving torque, braking torque and also utilization in a wide range of applications in industry. Yet further, the present invention may also be designed to provide bi-directional or one-way torque coupling. Further still, the present invention may be designed to provide either passive or active activation of the torque coupling element.

While the above description contains many specificities, these should not be construed as limitations on the scope of the invention, but rather as exemplifications of the embodiments thereof. Many other variations are possible. For example:

In any transmission of torque from one body to another, there is a "driving" element that is providing the torque to a "driven" element to which the torque is transmitted. In the embodiments described herein, the driving element is represented by the sprocket and freehub assembly and the driven element is represented by the rear hub. In these embodiments, the movable torque coupling element is normally permanently engaged with the rear hub shell (driven element) and moved to be selectively coupled or engaged to the freehub body assembly (driving element). Given the geometry of the components involved, this is normally the desirable arrangement. However, it is also envisioned that the torque coupling may be configured in the opposite arrangement wherein the movable torque coupling element is constantly engaged with the freehub body assembly (driving element) and is selectively coupled or engaged to the rear hub shell (driven element). It is further envisioned that the movable torque coupling element may be a two-part element with one part permanently engaged with the freehub body (driving element) and a second part permanently engaged to the rear hub shell (driven element). In this case the first and second movable torque coupling elements could engage each other to effect transmission of torque.

Further, all of the embodiments described herein include a movable axial and/or radial fastening means, which is normally retained within the hub assembly, to provide an axial connection between the hub assembly and the freehub assembly. It is envisioned that such a movable fastening means may alternatively be normally retained within the freehub assembly. A further alternative would be to provide a movable fastening means that is retained in a member that is external to both the hub and freehub assemblies. Such an external member may include the left dropout or other portion of the bicycle frame. A further alternative would be that the movable axial fastening means is not retained at all, but instead is withdrawn to become an additional separate part upon disassembly of the wheel from the bicycle frame.

All of the embodiments described herein utilize a means for axial engagement that spans between the driving and the driven elements. In FIGS. 1a–d, it is the control shaft, which spans the two elements, using a threaded connection for axial engagement. In FIGS. 4a–d, it is the torque coupling which spans the two elements, again using a threaded connection for axial engagement. While this axial engagement insures a firm connection, it is envisioned that such an engagement may be achieved via means completely outside of the hub assembly. For example, the hub assembly may be axially fixed solely to the left dropout and the freehub assembly may be axially fixed solely to the right dropout. In such a case, it is the rigidity of the bicycle frame that spans between the two dropouts, which provides the axial locating connection between the two elements.

All of the embodiments described herein utilize a threaded connection to provide axial engagement between the driving and driven members. While such a threaded connection is preferable, it is envisioned that numerous alternative connection means, known to industry, may be substituted with satisfactory results, including: push-on connectors, ¼-turn connectors, bayonet connectors, locking pins, retractable-ball connectors, magnetic, etc.

In the preferred embodiment, the movable torque coupling element is displaced axially and includes a spline engagement with both the hub and the freehub body. Torque is transmitted from the freehub body to the movable torque element via a spline engagement and this torque is further transmitted between the moveable torque element and the hub shell via a second spline engagement between those two components. Thus, as illustrated in FIGS. 1a–d, the freehub body is linked to the hub via two separate spline engagements. While this series of longitudinal spline engagements constitute a relatively straightforward method of creating the aforementioned engagements, it is also envisioned that a wide variety of alternate means of engagement may alternatively be employed, including, but not limited to, helical splines, face splines, ratchet teeth, pawls, friction plates, wedges, pins, keys, etc.

Further, while it is preferable that such a torque coupling engagement between driving and driven members be activated by purely axial movement as shown in the embodiments herein, it is envisioned that such an engagement means may be achieved through activation in a radial direction as well. For example, a cam may be incorporated into the assembly of the driven element, serving to urge keys to extend out radially or extend with a radial component of movement. These keys could then engage in mating pockets in the driving element to transmit torque.

It should be noted that this disclosure focuses primarily on the driving torque between the driving sprockets and the rear hub. It is also envisioned that a similar arrangement, including a movable torque coupling, may be utilized to effect braking torque transmission such as between a disc brake arrangement and the wheel hub. In such an arrangement, the wheel hub could be considered to be the driving element and the brake disc could be considered the driven element. Further, while the description herein focuses on application of the present invention to the bicycle, such a movable torque coupling arrangement may be adapted for use in any application, industrial, commercial or otherwise, which would benefit from such a movable torque coupling.

All of the embodiments describe an arrangement wherein the hub shell rotates about a stationary axle that is fixed to a frame. This is the preferred arrangement, particularly in bicycle wheel applications. However, an alternative arrangement is also envisioned wherein the axle may instead rotate with the hub shell and be rotatable within the dropouts or within an outer fixed sleeve.

It is understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications, which are within its spirit and scope as defined by the claims.

What is claimed is:

1. A torque coupling arrangement, comprising:
   a rotational driving element;
   a rotational driven element;
   at least one torque coupling element, which is displaceable to extend at least one of said driving element and said driven element into rotational engagement with the other of said driving element and said driven element for transmission of torque between said driving element and said driven element, and to retract from said rotational engagement, and
   wherein said torque coupling element is expandable and contractible in the axial direction, wherein, in the expanded position, said torque coupling element is engaged with both said driving element and said driven element for transmission of torque, and wherein in the contracted position, said torque coupling element is disengaged from at least one of said driving element and said driven element.

2. A torque coupling arrangement according to claim 1, wherein said driving element and driven element have axes of rotation, and wherein the axis of rotation of said driving element is colinear with the axis of rotation of said driven element.

3. A torque coupling arrangement according to claim 1, wherein said driving element and driven element have axes of rotation, and wherein the axis of rotation of said driving element and the axis of rotation of said driven element are non-colinear.

4. A torque coupling arrangement according to claim 1, including a frame, wherein said driving element is axially and radially fixed to said frame and said driven element is selectively moved into and out of position for said engagement with said driving element.

5. A torque coupling arrangement according to claim 1, including a frame, wherein said driven element is axially and radially fixed to said frame and said driving element is selectively moved into and out of position for said engagement with said driven element.

6. A torque coupling arrangement according to claim 1, wherein at least one of said driving element and said driven element is axially fixed.

7. A torque coupling arrangement according to claim 1, wherein said torque coupling element is engaged with said driven element and disengageable with the driving element.

8. A torque coupling arrangement according to claim 1, wherein said torque coupling is engaged with said driving element and disengageable from the driven element.

9. A torque coupling arrangement according to claim 1, wherein said torque is transmitted bi-directionally.

10. A torque coupling arrangement according to claim 1, wherein said torque is transmitted between said driving and said driven elements in only one direction of rotation and allows independent rotation between said driving and said driven elements in the opposite direction of rotation.

11. A torque coupling arrangement according to claim 1, including an axle, wherein at least one of said driving element and said driven element is rotatable about said axle.

12. A torque coupling arrangement according to claim 11, wherein said axle is stationary.

13. A torque coupling arrangement according to claim 11, wherein said torque coupling is generally annular in form and includes an axial through opening surrounding said stationary axle.

14. A torque coupling arrangement according to claim 11, including an outer fixed sleeve, wherein at least one of said driving element and said driven element is rotatable within said sleeve.

15. A torque coupling arrangement according to claim 1, wherein said torque coupling includes longitudinal splines to mate with corresponding longitudinal splines of at least one of said driving element and said driven element.

16. A torque coupling arrangement according to claim 1, wherein said torque coupling includes helical splines to mate with corresponding helical splines of at least one of said driving element and said driven element.

17. A torque coupling arrangement according to claim 16, wherein said helical splines are helical threads.

18. A torque coupling arrangement according to claim 16, wherein the direction of the helix of said helical splines serve to axially draw said driving element and said driven element toward each other.

19. A torque coupling arrangement according to claim 1, wherein said torque coupling element provides a ratio drive engagement between said driving and said driven elements such that said rotational engagement results in a differential angular rotation between said driving element and said driven element.

20. A torque coupling arrangement according to claim 1, wherein said torque coupling element is retained to one of said driving element and said driven element.

21. A torque coupling arrangement according to claim 1, including means to at least one of actively engage and actively disengage said torque coupling element from at least one of said driving element and said driven element.

22. A torque coupling arrangement according to claim 1, including a control shaft.

23. A torque coupling arrangement according to claim 22, including an outer axle, wherein said control shaft is movable at least one of axially and rotatably with respect to said outer axle.

24. A torque coupling arrangement according to claim 23, including a frame, wherein said outer axle is axially clamped to said frame upon assembly of the driving element or the driven element and said frame.

25. A torque coupling arrangement according to claim 22, wherein said control shaft includes means to link said torque coupling element, such that manipulation of said control shaft is operative to at least one of actively engage and actively disengage said torque coupling element from at least one of said driving element and said driven element.

26. A torque coupling arrangement according to claim 1, including means to passively engage said torque coupling element with at least one of said driving element and said driven element.

27. A torque coupling arrangement according to claim 25, including an outer axle, wherein said outer axle surrounds said control shaft, including at least one opening in the sidewall of said outer axle, wherein said control shaft is linkable to said torque coupling element through said at least one opening.

28. A torque coupling arrangement according to claim 22, wherein said control shaft includes a threaded portion to threadably engage and provide axial locating means between said driving element and said driven element.

29. A torque coupling arrangement according to claim 22, including a handle connected to said control shaft, said handle facilitating manual manipulation of said control shaft.

30. A torque coupling arrangement according to claim 22, including a frame, wherein said control shaft includes a first and second axial position and wherein said control shaft is radially engaged to the frame in said first axial position and radially disengaged from said frame in said second axial position.

31. A torque coupling arrangement according to claim 22, wherein said control shaft serves as an axle for at least one of said driving element and said driven element.

32. A torque coupling arrangement according to claim 31, wherein said control shaft serves as a stationary axle for at least one of said driving element and said driven element.

33. A torque coupling arrangement according to claim 22, wherein said control shaft includes a shoulder, which serves to create a limit stop to the axial travel of said control shaft.

34. A torque coupling arrangement according to claim 1, wherein said torque coupling element is axially fixed to a rotatable portion of at least one of said driving element and said driven element and wherein the rotatable portion of at least one of said driving element and said driven element that is axially fixed to said torque coupling element may be axially shifted for said rotational engagement.

35. A torque coupling arrangement according to claim 1, wherein said torque coupling element is axially contractable within at least one of said driving element and said driven element such that, in said axially contracted position, at least one of said driving element and said driven element is operative for assembly in a generally radial direction.

36. A torque coupling arrangement according to claim 35, wherein said assembly includes assembly with at least one stationary member.

37. A torque coupling arrangement according to claim 1, wherein the axial width of at least one of said driving element and said driven element is expandable and contractible in the axial direction.

38. A torque coupling arrangement-according to claim 1, wherein said torque coupling element serves to at least one of axially and radially fix said driven element and said driving element to each other.

39. A torque coupling arrangement according to claim 22, wherein said control shaft serves to at least one of axially and radially fix said driven element and said driving element to each other.

40. A torque coupling arrangement according to claim 1, including a frame wherein said frame serves to at least one of axially and radially fix said driven element and said driving element to each other.

41. A torque coupling arrangement according to claim 1, wherein means connected to at least one of said driving element and said driven element serves to axially fix said driven element and said driving element to each other.

42. A torque coupling arrangement according to claim 1, wherein rotatable portions of said driving element and said driven element are in axial contact during assembly.

43. A torque coupling arrangement according to claim 1, wherein rotatable portions of the driving element and driven element are axially separated from each other during assembly.

44. A torque coupling arrangement according to claim 1, wherein a threaded engagement is employed to provide axial positioning between the driving element and the driven element.

45. A torque coupling element according to claim 21, wherein said disengaged position permits the displacement of said driving element from said driven element in a generally axial direction.

46. A torque coupling arrangement according to claim 1, wherein said torque coupling element includes a friction surface to mate with a corresponding friction surface of at least one of said driving element and said driven element.

47. A torque coupling arrangement according to claim 1, wherein said torque coupling element includes face splines to mate with corresponding face splines of at least one of said driving element and said driven element.

48. A torque coupling arrangement according to claim 1, wherein said torque coupling element includes at least one sawtooth shaped spline to mate with at least one correspondingly shaped spline of at least one of said driving element and said driven element, such that the said spline engagement provides blocking engagement to transmit torque in one direction of rotation and axial camming engagement for rotary slipping in the opposite direction of rotation.

49. A torque coupling arrangement according to claim 1, wherein said at least one torque coupling element is movable with a radial component of motion to provide engagement with at least one of said driving element and said driven element for transmission of torque between said driving element and said driven element.

50. A torque coupling arrangement according to claim 22, wherein said control shaft is retained to one of said driving element and said driven element.

51. A torque coupling arrangement according to claim 16, wherein said helical splines serve to axially draw said torque coupling element into engagement with at least one of said driving element and said driven element.

52. A torque coupling arrangement bicycle wheel, comprising:

a rotational driving element;

a rotational driven element;

at least one torque coupling element, which is displaceable to extend at least one of said driving element and said driven element into rotational engagement with the other of said driving element and said driven element for transmission of torque between said driving element and said driven element, and to retract from said rotational engagement, and including a spring to bias said torque coupling element.

53. A torque coupling arrangement according to claim 52, wherein said spring to bias said torque coupling element into engagement with said driving element.

54. A torque coupling arrangement according to claim 52, wherein said spring to bias said torque coupling element into engagement with said driven element.

55. A torque coupling arrangement according to claim 52, wherein said spring serves to bias said torque coupling element toward said retracted position.

56. A torque coupling arrangement, comprising:

a rotational driving element;

a rotational driven element;

at least one torque coupling element, which is displaceable to extend at least one of said driving element and said driven element into rotational engagement with the other of said driving element and said driven element for transmission of torque between said driving element and said driven element, and to retract from said rotational engagement, and including a control shaft, wherein said control shaft includes means to link said torque coupling element, such that manipulation of said control shaft is operative to at least one of actively engage and actively disengage said torque coupling element from at least one of said driving element and said driven element, and wherein said means to link includes a snapring, which is engaged with said control shaft and extends to engage said torque coupling element.

57. A torque coupling arrangement bicycle wheel, comprising:

a rotational driving element;

a rotational driven element;

at least one torque coupling-element, which is displaceable to extend at least one of said driving element and said driven element into rotational engagement with the other of said driving element and said driven element for transmission of torque between said driving element and said driven element, and to retract from said rotational engagement, and wherein said torque coupling includes at least one axial pin to mate with a corresponding socket of at least one of said driving element and said driven element.

\* \* \* \* \*